United States Patent
Kobayashi et al.

(10) Patent No.: US 7,195,830 B2
(45) Date of Patent: Mar. 27, 2007

(54) APPARATUS, MECHANISM AND PROCESS FOR WARMING-UP FUEL CELL

(75) Inventors: Tomoki Kobayashi, Saitama (JP);
Takahiro Kuriiwa, Saitama (JP);
Yoshio Nuiya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 525 days.

(21) Appl. No.: 10/056,720

(22) Filed: Jan. 24, 2002

(65) Prior Publication Data

US 2002/0098396 A1    Jul. 25, 2002

(30) Foreign Application Priority Data

Jan. 25, 2001   (JP) ............... 2001-016523

(51) Int. Cl.
*H01M 8/00*   (2006.01)
(52) U.S. Cl. ............ 429/13; 429/17; 429/20; 429/24; 429/25; 429/26
(58) Field of Classification Search ........ 429/13, 429/17, 20, 24–26, 12
See application file for complete search history.

(56) References Cited

U.S. PATENT DOCUMENTS

| | | | |
|---|---|---|---|
| 4,396,114 A * | 8/1983 | Golben et al. | 206/7 |
| 4,826,741 A * | 5/1989 | Aldhart et al. | 429/19 |
| 6,015,065 A * | 1/2000 | McAlister | 220/586 |
| 6,240,971 B1 * | 6/2001 | Monette et al. | 138/153 |
| 6,350,535 B1 * | 2/2002 | Kralick | 429/13 |
| 6,406,808 B1 * | 6/2002 | Pratt et al. | 429/26 |
| 6,586,124 B2 * | 7/2003 | Kelley et al. | 429/17 |
| 6,835,490 B1 * | 12/2004 | Okada et al. | 429/59 |

FOREIGN PATENT DOCUMENTS

| | | | |
|---|---|---|---|
| JP | 60-68 A | * | 1/1985 |
| JP | 09-73912 A | * | 3/1997 |
| JP | 2001-213605 A | * | 8/2001 |
| WO | WO00/58529 A1 | * | 10/2000 |

OTHER PUBLICATIONS

JPO English abstract for JP 60-68 A (publication date of Jan. 1985).*
IPDL JPO Machine Translation for JP 09-73912 A (publication date of Mar. 1997).*
IPDL JPO Machine Translation for JP 2001-213605 A (publication date of Aug. 2001).*
"Hydrogen Storage" [online]. FuelCellStore.com 2002, 2003 [retrieved on Jul. 24, 2004]. Retrieved from the Internet: <URL: http://www.fuelcellstore.com/information/hydrogen_storage.html>.*
Derwent abstract for JP 90061401 B (publication date Dec. 20, 1990).*

* cited by examiner

*Primary Examiner*—Patrick Joseph Ryan
*Assistant Examiner*—Jane Rhee
(74) *Attorney, Agent, or Firm*—Lahive & Cockfield, LLP; Anthony A. Laurentano, Esq.

(57) ABSTRACT

Hydrogen stored in a high-pressure tank 21 is supplied to a metal hydride (MH) tank 31 to be occluded. Cooling water of a cooling system C1 for a fuel cell 10 is heated through the heat generated at this time to warm-up the fuel cell. By such a configuration, the fuel cell can be warmed up without consuming the valuable hydrogen.

2 Claims, 13 Drawing Sheets

APPARATUS, MECHANISM AND PROCESS FOR WARMING-UP FUEL CELL

BACKGROUND OF THE INVENTION

1. Field of the Invention

The present invention relates to an apparatus, a mechanism, and a process for warming-up a fuel cell in order to start a cold fuel cell. More particularly, the invention concerns an apparatus, a mechanism, and a process for warming-up a fuel cell utilizing a hydrogen-occlusion alloy to start a fuel cell under a condition of low temperature.

2. Description of Related Arts

In recent years, fuel cell electric vehicles (hereinafter abbreviated as "FCEV") have drawn attraction from ecological viewpoints, due to the understanding that the amount of carbon dioxide exhausted, which leads to global warming, should be suppressed. A FCEV carries a fuel cell (hereinafter abbreviated as "FC"), which generates power due to electrochemical reaction between hydrogen ($H_2$) and oxygen ($O_2$) in air, and supplies the power generated from FC to a driving motor at which driving force is brought about.

A FC exhibits its performances at the fullest extent at a given temperature. For example, in the case of a proton exchange membrane (PEM) type FC, the temperature for which FC exhibits the best performances is approximately 80° C., and if the temperature is lower than this, the power generation performance (electromotive force) is decreased. For this reason, in order to start FC at a winter season or at a cold district, FC should be warmed-up (i.e., FC should be heated to a prescribed temperature).

The conventional warming-up of FC is conducted as follows:

(1) Warming-up of FC through Heater:

An electric heater is heated by a battery possessed by a FCEV or a commercial electric power source provided on a garage or such to warm-up FC through the heat thus generated.

(2) Warming-up of FC through Hydrogen Combustor etc.:

Hydrogen or methanol (or gasoline) possessed by a FCEV as a fuel (raw fuel) is supplied to and combusted in a catalytic combustor etc., the combustion heat being utilized to warm-up the FC.

(3) Warming-up of a FC utilizing Heat generated by the FC Itself:

Heat generated due to the electrochemical reaction between hydrogen and oxygen (so-called self heating of FC) at starting the power generation of FC is used to warm-up FC.

(4) Other Processes for Warming-up a FC:

A heat accumulating agent or a heating agent is utilized to warm-up a FC.

However, the warming-up of FC through the electric heater described under Item (1) suffers from the drawback in terms of consumption of the battery. Also, at a low temperature, sufficient power can be supplied from the battery in some cases. In the case of utilizing the commercial electric power source, a FC cannot warm-up at a portion where no commercial electric power source is provided, such as on the road. In the case of warming-up of a FC through the hydrogen combustor or such described under Item (2), the fuel (raw fuel), which should be used for the power generation of the FC, is unduly consumed. In the case of the warming-up of a FC utilizing the heat generated by the FC itself, the FC cannot be warmed-up under the situation where the FC cannot generate power. Also, the consumption of the fuel (raw) for warming-up a FC is not preferable. The use of the heat accumulating agent or the heating agent mentioned under Item (4) has drawbacks, including that it is difficult to take heat at a necessary time and the heat accumulating agent or a heating agent can be repeatedly used only with difficulty. That is, in the prior art, energy exclusively used for warming-up a FC is required or energy, which should be used in the power generation, is wasted. Also, the use of the heater or the hydrogen combustor, etc, which can only be used in the warming-up, and the use of specialized heat accumulating agent or heating agent are problematic in terms of enlarging the fuel cell system. The warming-up of a FC should be conducted rapidly, which requires a large quantity of energy or an enlarged warming-up apparatus. However, the warming-up of a FC must also be carried out in a simple configuration with ease. These problems are applicable to a hydrogen automobile, which carries an internal combustion engine (apparatuses consuming hydrogen) utilizing hydrogen as fuel.

SUMMARY OF THE INVENTION

An object of the present invention is, therefore, to solve the problems associated with the prior art and to provide an apparatus, a mechanism, and a process for warming-up a fuel cell.

In light of the above situation, we have made serious studies in researches. As a result, taking notice of the fact that a hydrogen-occlusion alloy is heated during the occlusion of hydrogen, and the fact that the heat generated can be used repeatedly, we have accomplished the present invention.

Specifically, the present invention is directed to a warming-up apparatus for a fuel cell, which generates power due to an electrochemical reaction between hydrogen gas, which is fuel, and oxygen gas, which is an oxidant, which comprises:

(a) a high-pressure tank for storing hydrogen;

(b) a hydrogen-occlusion alloy tank having a hydrogen-occlusion alloy accommodated therein;

(c) hydrogen-transferring means which transfers the hydrogen discharged from said high-pressure tank to the hydrogen-occlusion alloy in said hydrogen-occlusion alloy tank; and (d) heat-transmitting means which transmits the heat generated in the hydrogen-occlusion alloy during the course of storing the hydrogen gas transferred by said hydrogen-transferring means into said hydrogen-occlusion alloy tank to the fuel cell.

The warming-up apparatus of the present invention may further comprises a water cooling system which discharges out the heat generated at the time of the power generation in the fuel cell, and wherein said heat-transmitting means transmits the heat generated in the hydrogen-occlusion alloy to cooling water of said water cooling system to heat the fuel cell via the cooling water.

In such a warming-up apparatus, said heat-transmitting means may be actuated when the temperature of said cooling water is not more than a prescribed temperature.

Also, the warming-up apparatus of the present invention may further comprise a hydrogen-discharging means to discharge the hydrogen having been occluded in said hydrogen-occlusion alloy out of the hydrogen-occlusion alloy tank in order to use the hydrogen for the power generation in the fuel cell.

In such a warming-up apparatus, said hydrogen-discharging means preferably discharges the hydrogen having been occluded in said hydrogen-occlusion alloy depending upon the warming-up condition of the fuel cell.

Also in such a warming-up apparatus, said hydrogen-discharging means may discharge the hydrogen having been occluded in said hydrogen-occlusion alloy depending upon the gas pressure of the anode of the fuel cell.

Alternatively, in such a warming-up apparatus, said hydrogen-discharging means may discharge the hydrogen having been occluded in said hydrogen-occlusion alloy depending upon the hydrogen consumption amount consumed by the fuel cell.

In the warming-up apparatus of the present invention, the power generation in the fuel cell may be started by supplying the hydrogen from the high-pressure tank after the actuation of the heat-transmitting means.

The present invention also relates to a process for warming-up a fuel cell, which generates power due to an electrochemical reaction between hydrogen gas, which is fuel, and oxygen gas, which is an oxidant, which comprises the following steps:

(A) a step for storing hydrogen from a high-pressure tank in the hydrogen-occlusion alloy within a hydrogen-occlusion alloy tank; and (B) a step for transmitting the heat generated at the time of storing the hydrogen in the hydrogen-occlusion alloy.

The process of the present invention may further comprise step (C) for supplying the hydrogen to the fuel cell from said high-pressure tank to generate the power after heating the fuel cell.

Alternatively, the process of the present invention may further comprise step (D) for monitoring the temperature of the fuel cell, and step (E) for repeating steps (A) and (B) to heat the fuel cell, when the monitored temperature is less than a prescribed temperature, and step (F) for repeating steps (A) and (B) to heat the fuel cell and for supplying the hydrogen from said high-pressure tank to the fuel cell to start the power generation, when the monitored temperature is not less than a prescribed temperature.

The present invention further relates to a mechanism for warming-up a fuel cell, having a configuration of warming-up the fuel cell by a heat generated during the occlusion of hydrogen in a hydrogen-occlusion alloy.

In the mechanism for warming-up a fuel cell of the present invention, cooling water for cooling the fuel cell may be heated by said generated heat to warm-up the fuel cell.

Also, the mechanism for warming-up a fuel cell of the present invention may have a configuration that when the temperature of the fuel cell is not higher than a prescribed temperature, said heat is generated to warm-up the fuel cell.

Further, the mechanism for warming-up a fuel cell of the present invention may have a configuration that the hydrogen having been occluded in the hydrogen-occlusion alloy is supplied to the fuel cell as fuel.

In such a mechanism for warming-up a fuel cell, said hydrogen may be supplied to the fuel cell depending upon the anode pressure of the fuel cell.

Also, in such a mechanism for warming-up a fuel cell of the present invention, said hydrogen may be supplied to the fuel cell depending upon the amount of hydrogen consumed by the fuel cell.

In the mechanism for warming-up a fuel cell of the present invention, the fuel cell may start the power generation after the warming-up.

In such a mechanism for warming-up a fuel cell, the fuel cell may generate power while warming-up the fuel cell when the temperature of the fuel cell is within a given temperature range, whose upper limit is said prescribed temperature, and the warming-up is performed with no power generation when the temperature of the fuel cell is under the lower limit of said given temperature range.

DESCRIPTION OF PREFERRED EMBODIMENTS

Figure 1:
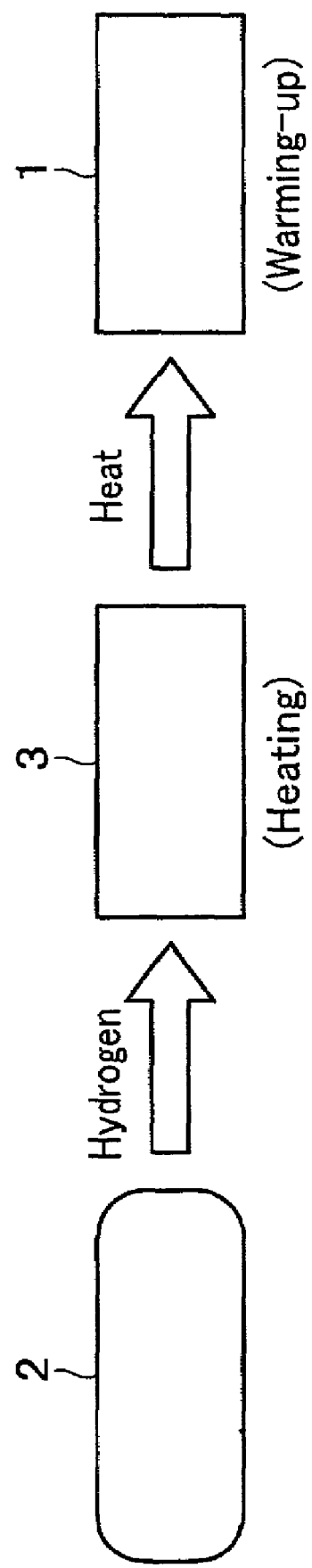
FIG. 1 is a schematic view explaining a principle of the warming-up of a FC according to the present invention.

Embodiments of the present invention will now be described by referring to the drawings.

<<Principle>>

First, the principle of warning-up a fuel cell (FC) according to the present invention will be described.

Figure 2:
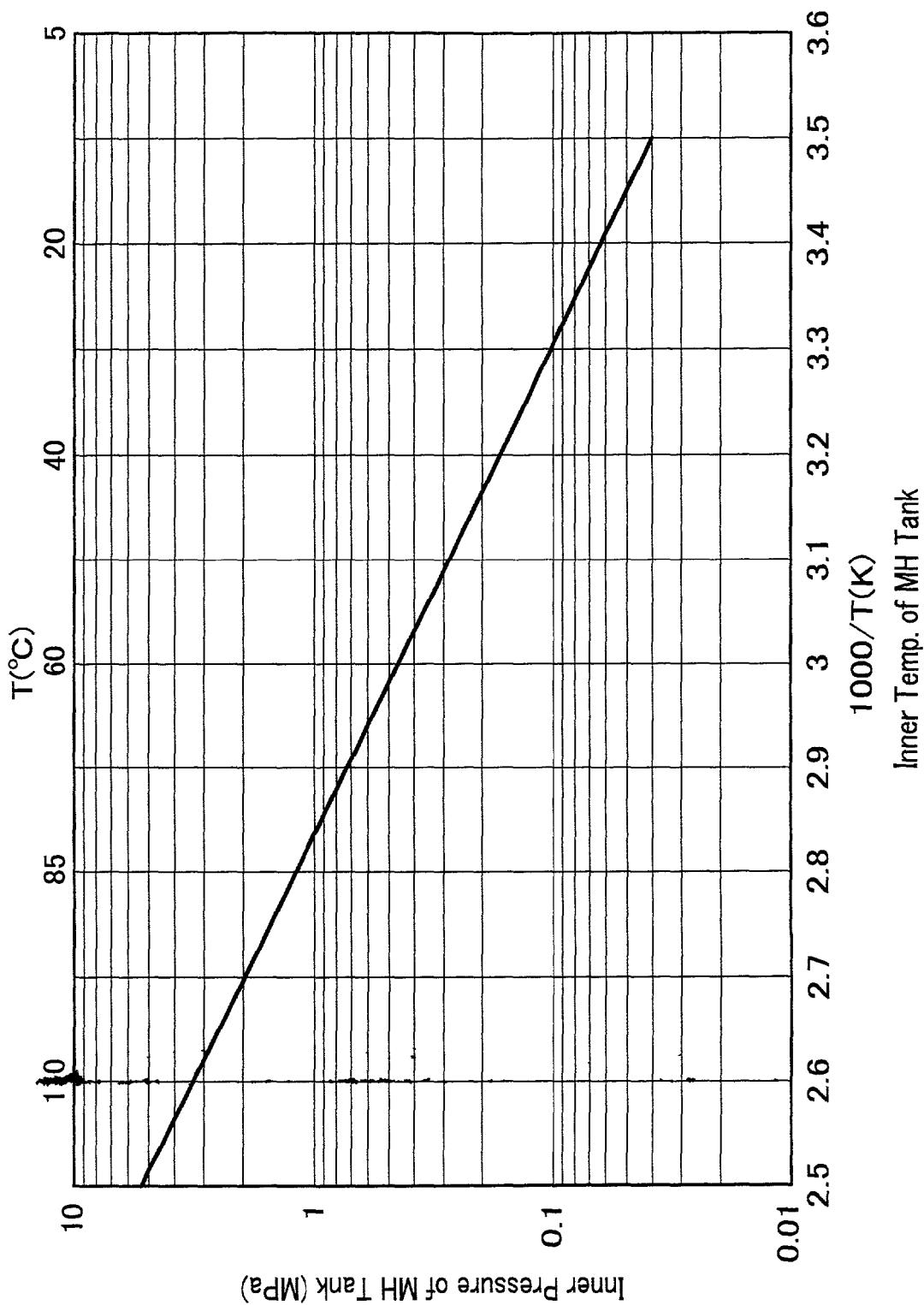
FIG. 2 exemplifies a drawing showing the relation between an inner temperature of a MH (metal hydride) tank and pressure characteristic.
Figure 3:
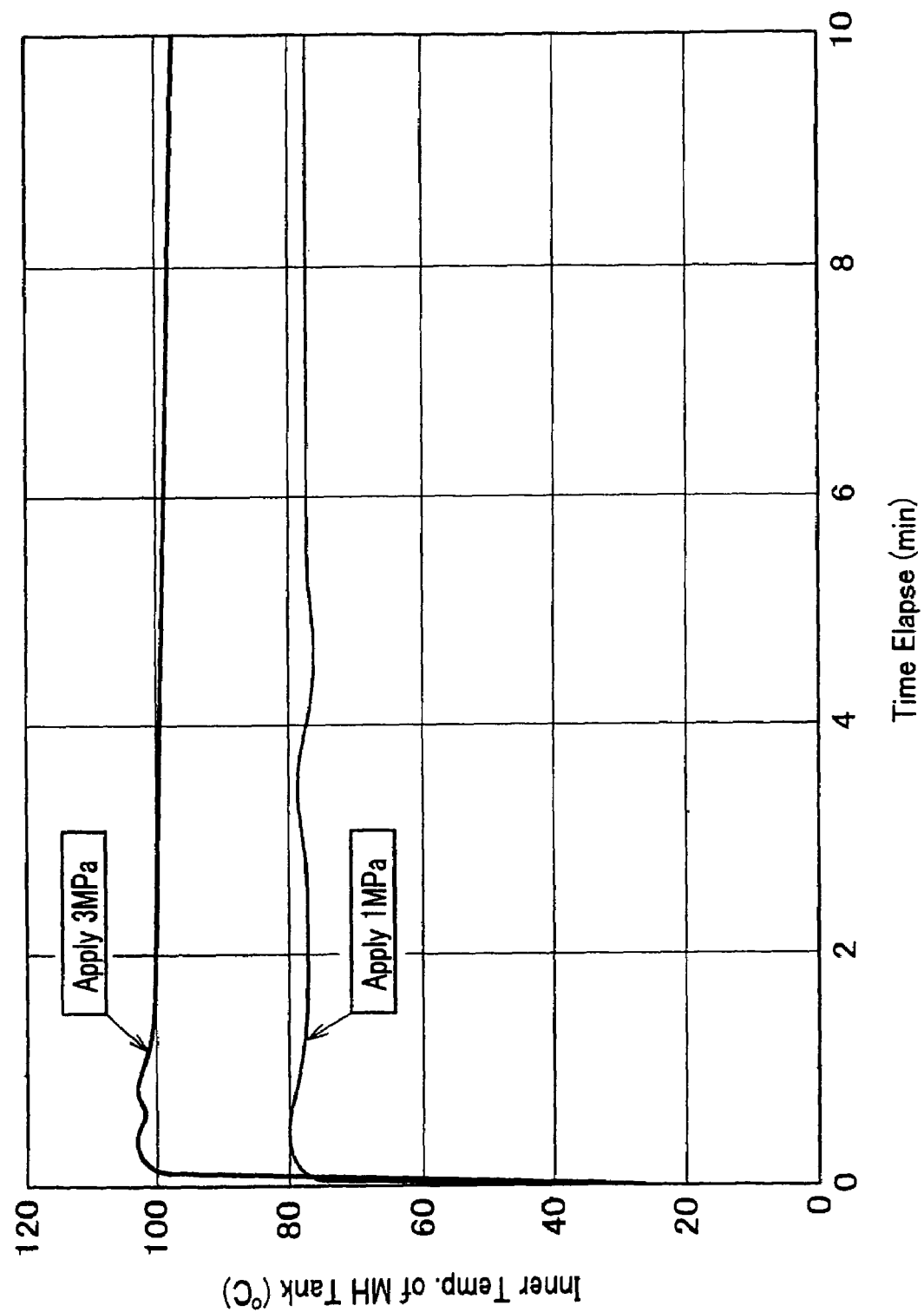
FIG. 3 is a time chart on which the changes in the inner temperature of a MH tank are plotted by varying hydrogen pressure applied to the MH tank.

FIG. 1 is a schematic view explaining a principle of the warming-up of a FC. FIG. 2 is a drawing showing one example of the relation between an inner temperature of a metal hydride (MH) tank and pressure characteristic. FIG. 3 is a time chart on which the changes in the inner temperature of an MH tank are plotted by varying hydrogen pressure applied to the MH tank. The expression of the temperature in Celsius in FIG. 2 is an indication for better understanding the temperature indication by 1000/T (K) (the temperature indication by Arrhenius plotting).

Symbol 1 in FIG. 1 is a fuel cell (FC: hydrogen consuming apparatus), which is subject of warming-up. Symbol 2 is a high-pressure hydrogen tank which stores hydrogen at a high pressure (for example approximately 25 MPa). Symbol 3 is an MH tank having a hydrogen-occlusion metal accommodated therein, which possesses a high pressure, gas-tight mechanism. Hydrogen is supplied to this MH tank 3 from the high-pressure hydrogen tank 2. The MH tank 3 has an inner pressure of approximately 0.1 MPa (normal pressure) before warming-up, which is suitable for occluding hydrogen.

At the time of starting the FC 1, hydrogen is supplied from the high-pressure tank 2 to the MH tank 3. At this time, the inner pressure of the MH tank 3 is increased and, simultaneously, the hydrogen-occlusion metal accommodated within the MH tank 3 occludes hydrogen to thereby generate heat, which increases the inner temperature of the MH tank 3. The relation between the inner pressure of the MH tank and the inner temperature of the MH tank is accorded with the inner temperature/pressure characteristics shown in FIG. 2. For instance, referring to FIG. 3, if the inner pressure of the MH tank 3 becomes 1 MPa, the inner temperature thereof becomes about 80° C. Also, if the inner pressure becomes 3 MPa, the inner temperature becomes about 105° C.

The heat thus generated in the MH tank is transmitted to the FC 1 via appropriate transmitting means, and warms-up FC 1. The transmission of the heat to the FC 1 can be conducted in any manner of heat conduction, heat radiation and/or heat convection. The heat can also be transmitted either in a direct heating manner or an indirect heating manner.

As shown in FIG. 3, the inner temperature of the MH tank 3 is sharply increased to the maximum temperature when the pressure is applied, and subsequently, the temperature becomes constant without increasing the temperature (during the course of keeping the temperature at constant, hydrogen is continuously occluded). The hydrogen-occlusion alloy is heating as a whole volume (whole mass). From this fact, considering the MH tank 3 as what is called hydrogen-occlusion heater (MH heater), unlike the combusting heater or the electric heater, the MH heater occurs no overshooting during the course of the heating. What is more, the MH heater reaches the maximum temperature within a shortest period of time. Consequently, the MH heater, which can be handled in the easiest manner, can rapidly warm-up the FC 1. As can be understood from FIG. 2 and FIG. 3, the temperature can by controlled by varying applied pressures. In this context, the MH heater can be assumed to be handled with ease. The amount of calories generated varies depending upon type of the hydrogen-occlusion alloy accommodated within the MH tank 3 and is proportional to the amount of hydrogen occluded in a given hydrogen-occlusion alloy.

FIG. 2 shows temperature-pressure characteristics of BBC (body centered cubic) type hydrogen-occlusion alloy. In the case where a typical BBC type hydrogen-occlusion alloy is accommodated within the MH tank, when the inner pressure of the MH tank becomes 3 MPa, the BBC type hydrogen-occlusion alloy occludes hydrogen in an amount of about 2.4 g (about 1.2 moles) per 100 g of alloy. In this case, the caloric value is approximately 15 kJ/g hydrogen, i.e., 15 kJ heat is generated when the BBC type hydrogen-occlusion alloy occlude 1 g of hydrogen. Examples of hydrogen-occlusion alloys which can be used in the present invention include, but are not restricted to:

$AB_2$ type alloys (Laves phase alloys), such as $TiCr_2$, $(Zn, Ti)(Ni, Mn, V, Fe)_2$ . . .

$AB_5$ type alloys, such as $LaNi_5$, $MmNi_5$ . . .

BCC type alloys, such as Ti—V—Cr, Ti—V—Mn . . . , and other types such as Mg type alloys.

The hydrogen-occlusion alloy can reversibly carry out occlusion and discharging of hydrogen. Accordingly, the hydrogen having been occluded in the hydrogen-occlusion alloy can be used as the fuel for the FC 1 (hydrogen-consuming apparatus). Alternatively, the occluded hydrogen may also be returned to the high-pressure tank 2. Upon discharging the hydrogen, the hydrogen-occlusion alloy can occlude hydrogen again, of course, with generating heat.

Next, embodiments in which the FC system is applied to a fuel cell electric vehicle (hereinafter abbreviated as "FCEV") are described.

First Embodiment

In the first embodiment, while warming-up the FC by the heat generated during occluding hydrogen into the hydrogen-occlusion alloy, hydrogen is supplied to the FC to generate power.

Figure 4:
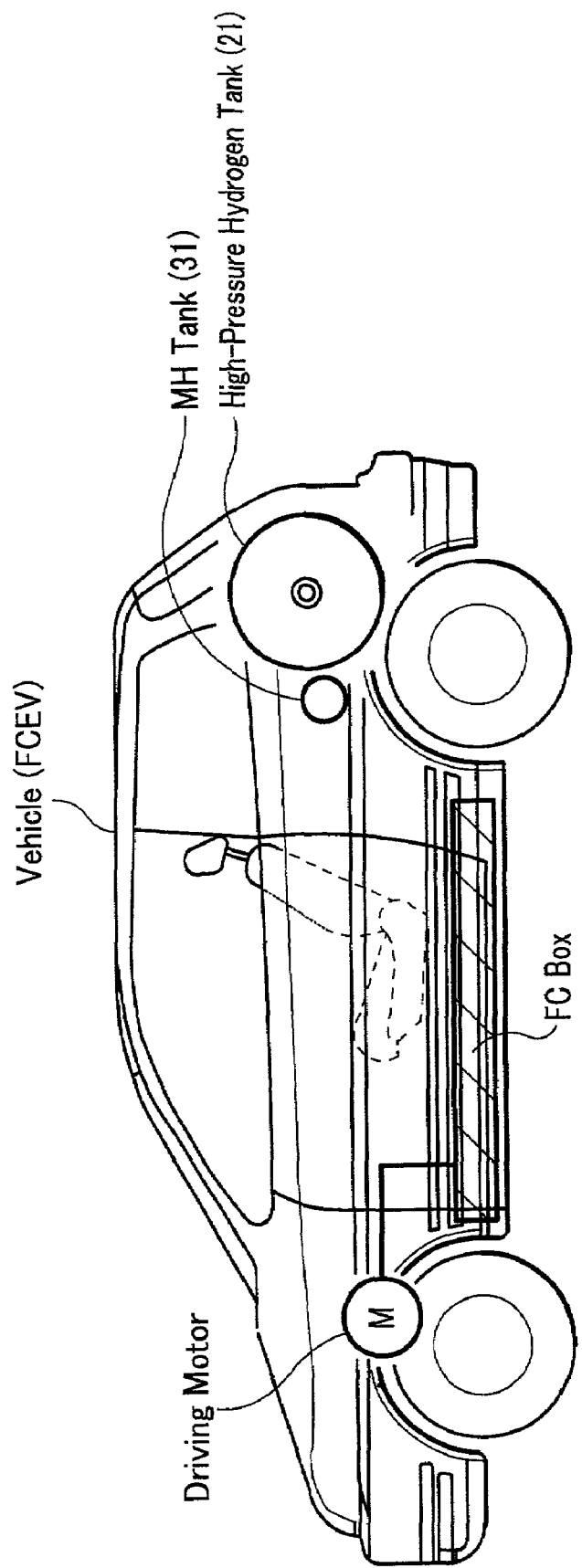
FIG. 4 is a partially perspective side view of a FCEV on which a FC system according to the first and second embodiments of the present invention.
Figure 5:
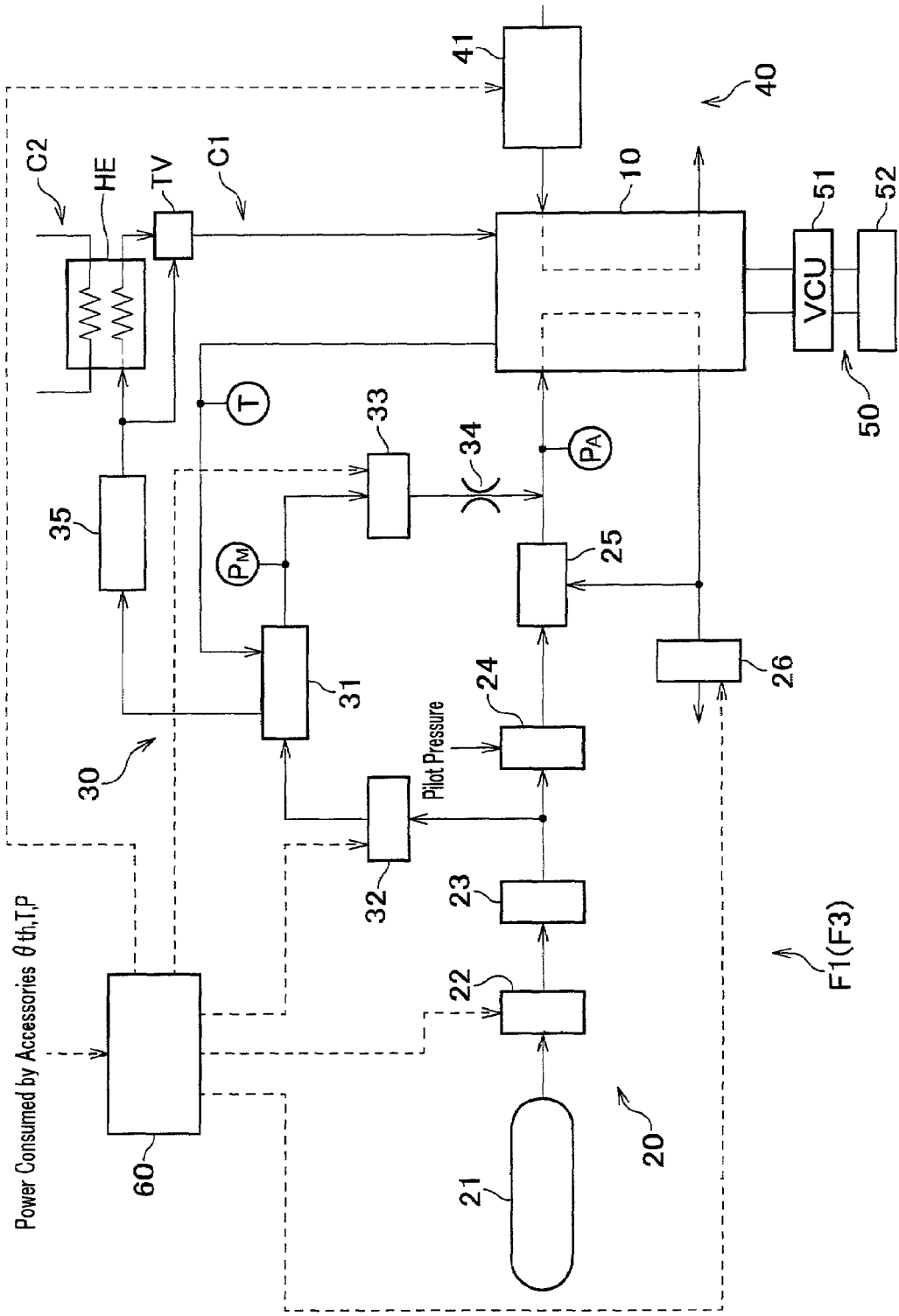
FIG. 5 is a block diagram of a FC system according to the first embodiment of the present invention.

FIG. 4 is a partially perspective side view of a FCEV including a FC system according to the first and second embodiments of the present invention. FIG. 5 is a block diagram of a FC system according to the first embodiment of the present invention.

First, the FCEV will be described.

The FCEV shown in FIG. 4 has a configuration that an FC box is placed under the floor of the cabin. The FC box has a FC 10 (see FIG. 5) accommodated therein. A high-pressure tank 21 and an MH tank 31 are crosswise placed on the upper portions of the rear wheels. The heat generated in the MH tank 31 is used in the warming-up of the FC 10 via cooling water passing through a piping making up a primary cooling system (not shown). The FC 10 is also connected to the high-pressure hydrogen tank 21 and the MH tank 31 via hydrogen supply pipes (not shown). The FC 10 allows oxygen and hydrogen to be electrochemically reacted with each other to generate power. The electric power thus generated is supplied to a driving motor to run the FCEV. The FC used in the drawings is a proton exchange membrane (PEM) type FC, which is composed of appropriately 300 single cells comprising a membrane electrode assembly (MEA) comprising an electrode membrane sandwiched between an anode electrode and a cathode electrode, which is sandwiched between separators, all of which are not shown.

Next, referring to FIG. 4, a fuel cell system FC1 according to the present invention will now be described.

The FC system F1 according to the first embodiment of the present invention comprises a FC 10, a hydrogen supply system 20, a warming-up system 30, an air supply system 40, an electric-consumption system 50, and a control unit 60.

As described previously, the FC 10 is PEM type FC, into which hydrogen as the fuel and air as the oxidant gas are supplied to generate power. The electric power thus generated in the FC 10 is taken out via a voltage control unit (VCU) 51. The VCU 51 is an electric power regulator having a limiter function, and regulates the electric current to be output from the FC 10. The current outputted via the VCU 51 is supplied to a load 52 such as a driving motor and accessories. The amount the output current is set depending upon an amount θth of stepping a pedal (not shown), the current consumed by the accessories, and the like.

The hydrogen-supplying system 20 serves to supply hydrogen as the fuel to the FC 10. For this reason, the hydrogen-supplying system 20 comprises a high pressure hydrogen tank 21, a primary shut-off valve 22, a primary regulator 23, a secondary regulator 24, and an ejector 25 being placed on the upstream of the FC 10, as well as a purge valve 26 placed on the downstream of the FC 10. All of these devices are connected via pipes so that the hydrogen from the high-pressure tank 21, passing through the primary shut-off valve 22, the primary regulator 23, the secondary regulator 24, and then the ejector 25, is supplied to the FC 10 (anode pole). The unused hydrogen exhausted from FC 10 via the pipe is returned to the ejector 25 to be circulated for reuse. Alternatively, the unused hydrogen exhausted from FC 10 is discharged out of the hydrogen-supplying system 20 via the purge valve 26. The hydrogen-supplying system 20 also supplies hydrogen to an MH tank 31 making up the warming-up system 30 which will be described later on. For this reason, the hydrogen-supplying system 20 possesses a branched pipe in order to supply hydrogen to the warming-up system 30, and store hydrogen in the high-pressure tank 21 at a pressure higher than the inner pressure of the MH tank 31.

The high-pressure tank 21 is a lightweight tank made of a fiber-reinforced plastic (FRP), which secures pressure resistance and gas-sealing properties. The high-pressure tank 21, for example, has an inner volume of approximately 100 liters and is filled with hydrogen at the maximum pressure of 25 MPa.

In this embodiment, the high-pressure tank 21 also plays a role in what is called a fuel tank.

The first shut-off valve 22 is a dielectrically actuated ON-OFF valve. The first shut-off valve 22 is opened or closed based upon a signal from the control unit 60, and shuts off the hydrogen flowing from the high-pressure hydrogen tank 21 in its closed state. On the other hand, in the opened state, the shut-off valve 22 allows the hydrogen from the high-pressure hydrogen tank 21 to flow toward the downstream side.

The primary regulator 23 is a pressure-reducing valve, which reduces the pressure of the hydrogen supplied from the high-pressure tank 21, which is regulated to a prescribed pressure. The secondary regulator 24 is a pressure-reducing valve, which further reduces the pressure of the hydrogen having been reduced by the primary regulator 1, and which is regulated to a prescribed pressure. Into the secondary regulator 24 is input the pressure at the inlet of the cathode electrode as a pilot pressure (see FIG. 5). For this reason, the secondary regulator 24 is actuated so as to minimize the variation between differential pressures between the anode and the cathode. It is noted that due to the pressure at the inlet of the cathode inputted to the secondary regulator 24 as the pilot pressure, the supplying hydrogen to the anode of the FC 10 is performed after an air compressor 41, which will be described fully later on, is started, and then the pressure at the inlet of the cathode is increased. More specifically, after the primary regulator is in an ON state and the air compressor 41 of the air-supplying system 40 is started, hydrogen is supplied from the hydrogen-supplying system to the FC 10.

The ejector 25 supplies the hydrogen having been supplied from the secondary regulator 24 to the anode of the FC 10. The ejector 25 is a circulating pump, which sucks the hydrogen having been used as the fuel gas, i.e., that exhausted from the anode of the FC 10 to be circulated utilizing the flowing of the hydrogen toward the anode. The use of the exhausted hydrogen by the circulation improves the fuel ratio.

The purge valve 26 is a dielectrically actuated ON-OFF valve. The purge valve 26 is opened or closed based on a signal from the control unit 60, and its closed state, it makes the exhausted hydrogen from FC 10 to flow towards the ejector 25. On the other hand, in the opened state, the purge valve 26 discharges the exhausted hydrogen from the FC 10 out of the system.

The pressure of the anode of the FC 10 in the hydrogen-supplying system (the pressure at the inlet of the anode) is detected by a pressure sensor PA, and the detected signal is configured to be sent to the control unit 60.

The warming-up system 30 supplies the heat generated in the MH tank 31 to the FC 10 to warm-up the FC 10. For this reason, the warming-up system 30 comprises the MH tank 31, a secondary shut-off valve 32, a tertiary shut-off valve 33, an aperture 34, and a circulating pump 35. In this embodiment, the warming-up system 30 utilizes the primary cooling system C1 of FC 10. The portion passing through hydrogen of the warming-up system 30 is composed of the MH tank 31, the secondary shut-off valve 32, the aperture 34, and pipes for connecting them. On the other hand, the portion passing through the cooling water is composed of the MH tank 31 (the portion of jacket which will be described below), the circulating pump 35, the FC 10, a heat exchanger HE making up the primary cooling stem C1 of FC 10, a thermostat valve TV, and the like, as well as the pipes connected to them (pipes of the primary cooling stem C1). The symbol C2 is the secondary cooling system.

Main devices making up the warming-up system 30 will now be described.

The MH tank 31 is a high-pressure gas-tight tank made of an aluminum alloy having higher heat resistance and higher heat conductivity than those of FRP-made tank, and a hydrogen-occlusion alloy is accommodated within the MH tank 31. The MH tank 31 can occlude hydrogen at the maximum pressure for example from 3 to 5 MPa. The outside of the MH tank 31 is covered with a water-cooling jacket, within which the cooling water for the FC 10 flows. Consequently, the heat generated during the course of occluding hydrogen in the hydrogen-occlusion alloy is transmitted to the cooling-water of the FC 10. By circulating the cooling-water into the FC 10, the FC 10 can be warmed-up. The amount of hydrogen charged within the MH tank 31 (which is in proportional to the inner volume of the MH tank 31) is set based upon the calories required for warming-up of the FC 10.

The secondary shut-off valve 32 is a dielectrically actuated ON-OFF valve. The secondary shut-off valve 32 is opened or closed based on a signal from the control unit 60. In the closed state, the secondary shut-off valve 32 shuts off the current of the hydrogen flowing from the primary regulator 23 towards the MH tank 31. On the other hand, in the opened state, the secondary shut-off valve 32 allows the hydrogen to flow from the primary regulator 23 towards the MH tank 31. In a usual state, the secondary shut-off valve 32 is in the closed state, but it becomes in the opened state at the time of supplying hydrogen to the MH tank 31 in order to generate heat.

The tertiary shut-off valve 33 is a dielectrically actuated ON-OFF valve. The tertiary shut-off valve 33 is opened or closed based on a signal from the control unit 60. In the closed state, the tertiary shut-off valve 33 shuts off the hydrogen flowing from the MH tank 31 towards the FC 10 (anode thereof). On the other hand, in the opened state, the tertiary shut-off valve 33 allows the hydrogen for flowing from the MH tank 31 towards the FC 10. In the normal state, the tertiary shut-off valve 33 is in the closed state, but it becomes in the opened state at the time of discharging the hydrogen occluded in the MH tank 31 to perform the power generation.

The aperture 34 serves as pressure-reducing means, which regulates the pressure and the flow amount of hydrogen to be supplied from the MH tank 13 to the FC 10 so as to be a pressure suitable for the pressure of the anode of FC 10 and/or to be a flow amount suitable for supplying the hydrogen to the anode. The hydrogen entering in the aperture 34 is supplied to a portion between the ejector 25, configuring the hydrogen-supplying system 20, and the anode of FC 10 (the hydrogen may also be supplied between the secondary regulator 24 and the ejector 25).

The circulating pump 35 serves as a pump for circulating the cooling water of the primary cooling system C1 for the FC 10. By the virtue of the circulating pump 35, the cooling water is circulated to the MH tank 31 (jacket portion thereof), then to the circulating pump 35, the thermostat valve TV (heat exchanger HE), and the FC 10. A substance for decreasing the freezing point of the cooling water such as ethylene glycol is added to the cooling water.

The temperature of the cooling water and the pressure of the MH tank 31 in the warming-up system are respectively detected by a thermo-sensor T and a pressure sensor PM. The detected signals are transferred to the control unit 60.

In addition to taking the heat generated from the MH tank 31 to warm-up the FC 10, the warming-up system 30 also plays a role in imparting the heat discharged generated in the FC to the MH tank 31 to thereby promote the discharging of the hydrogen occluded in the hydrogen-occlusion alloy during the discharge mode, which will be described later on. Upon discharging the hydrogen, the temperature of the hydrogen-occlusion alloy is decreased endothermically, in which case, the hydrogen-occlusion alloy cannot occlude hydrogen. At the discharge mode, since the cooling water is cooled by the MH tank 31, the loads of the cooling systems C1 and C2 for the FC 10 can be decreased. Specifically, the performance for cooling FC 10 is increased at the hydrogen-discharge mode.

The air-supplying system 40, which supplies air as the oxidant gas to the FC 10, possesses an air compressor 41.

The air compressor 41 comprises a supercharger driven by a motor, etc., and the revolution number of the motor is controlled by a signal from the control unit 60 or such. A higher revolution number corresponds to a larger amount of air supplied to the cathode of FC 10. The air to be supplied to the cathode of the FC 10 is humidified in a humidifier (not shown). Off gas, which has been exhausted from the FC, flows into the humidifier to humidify the air, which is to be supplied to the FC, and then discharged out of the system.

The power-consuming system 50 is composed of a VCU 51, the load 52, and the like, as described previously.

The control unit 60 plays a role in setting a target power generation of FC 10 based on an angle, θth, of stepping a pedal (not shown), the current consumed by the accessories, and the like. Also, the control unit 60 plays a role in setting an amount of air to be supplied to the FC 10 based on the target power generation (the revolution number of the motor of the air compressor 41). Also, the control unit 60 plays a role in setting an amount of hydrogen to be supplied from the MH tank 31 to the FC 10 based on the target power generation (proportional to the amount of the hydrogen consumed) and the inner pressure of the MH tank 31. The amount of the hydrogen having been occluded in the hydrogen-occlusion alloy to be discharged (the amount of the hydrogen to be supplied to the FC 10) is controlled by the control unit 60 in such a manner that it controls the tertiary shut-off valve 33. The control unit 60 plays a role in restricting the target power generation based on the amount of the power outputted by the FC 10 to set the current outputted from the FC 10. The VCU 51 takes the current from the FC 10 based on the amount of the output current. The control unit 60 also serves as judging whether or not the FC 10 should be warmed-up at the time of starting (control of shifting a mode to a warming-up mode), as controlling the warming-up (control of a warming-up mode), and as controlling the discharging of the occluded hydrogen (controlling of a discharge mode).

Next, the control from shifting a mode to a warming-up mode, control of a warming-up mode, and the control of a discharge mode will be described together with the operation of the above-mentioned fuel cell system F1.

Figure 6:
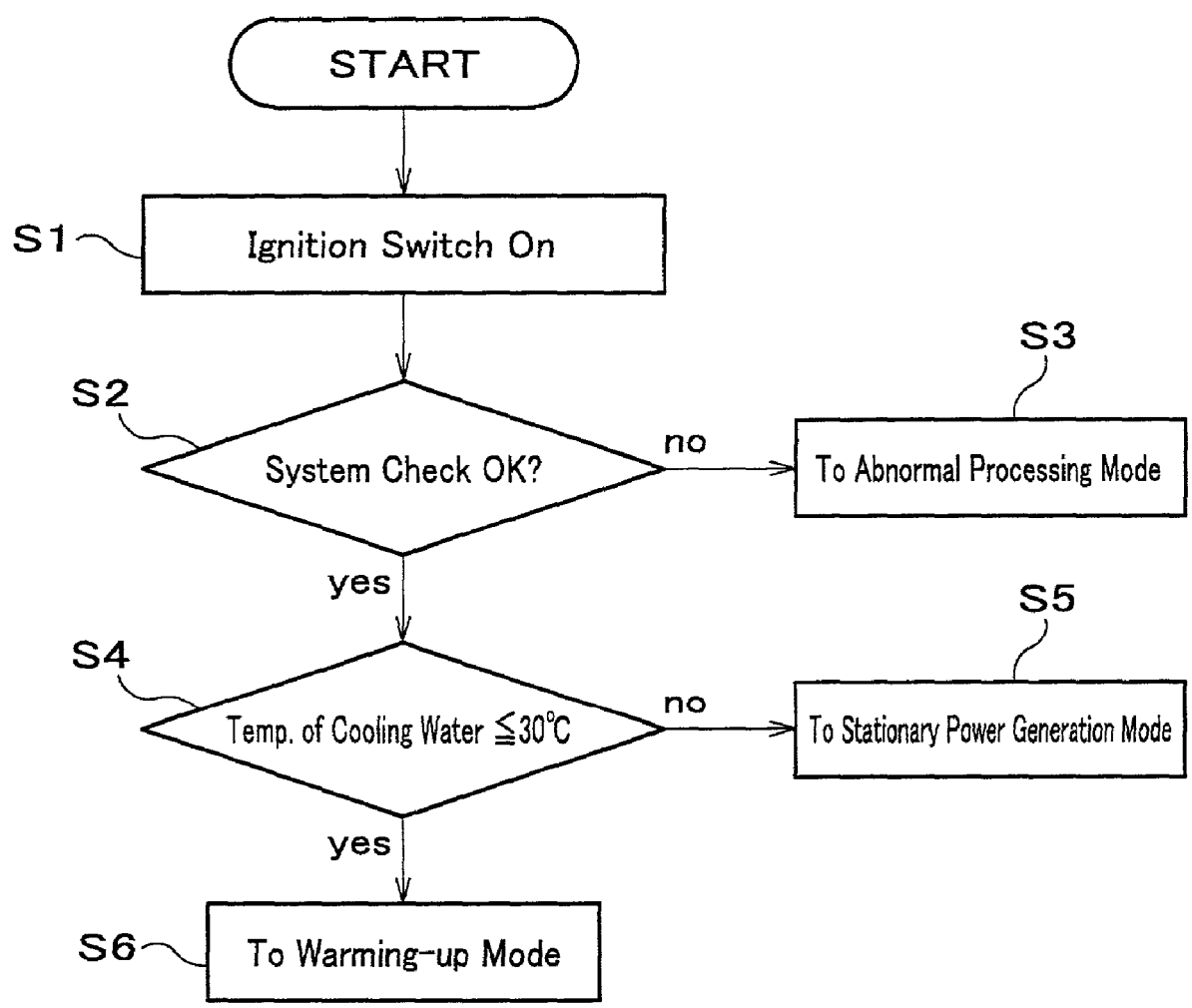
FIG. 6 is a flowchart which controls the shifting to a warming-up mode, which executes the warming-up of a FC according to the first embodiment.

FIG. 6 is a flowchart which illustrates the steps for controlling the shifting to a warming-up mode, which executes the warming-up of FC according to the first embodiment.

Figure 7:
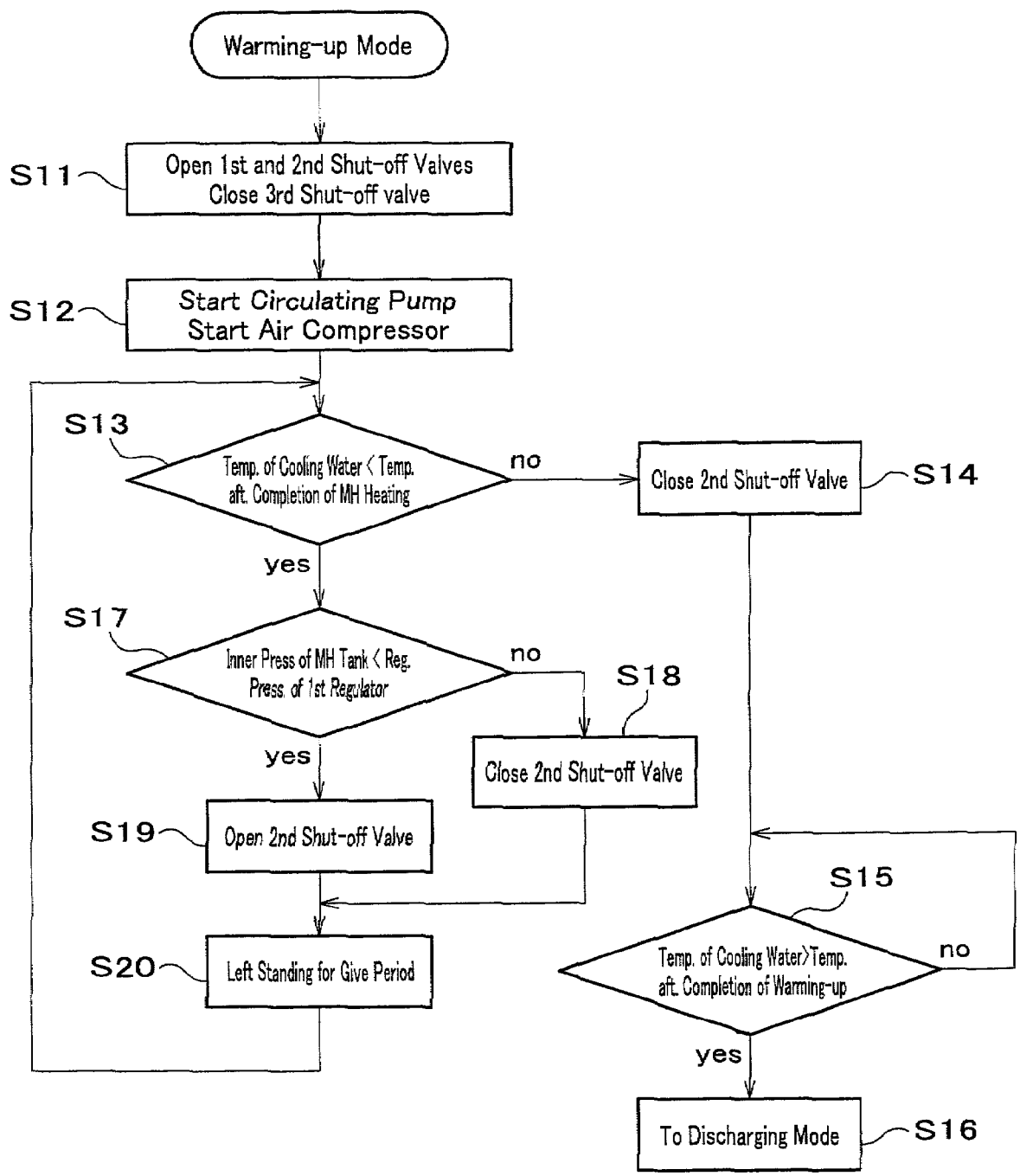
FIG. 7 is a flowchart which controls the warming-up in the first embodiment.
Figure 8:
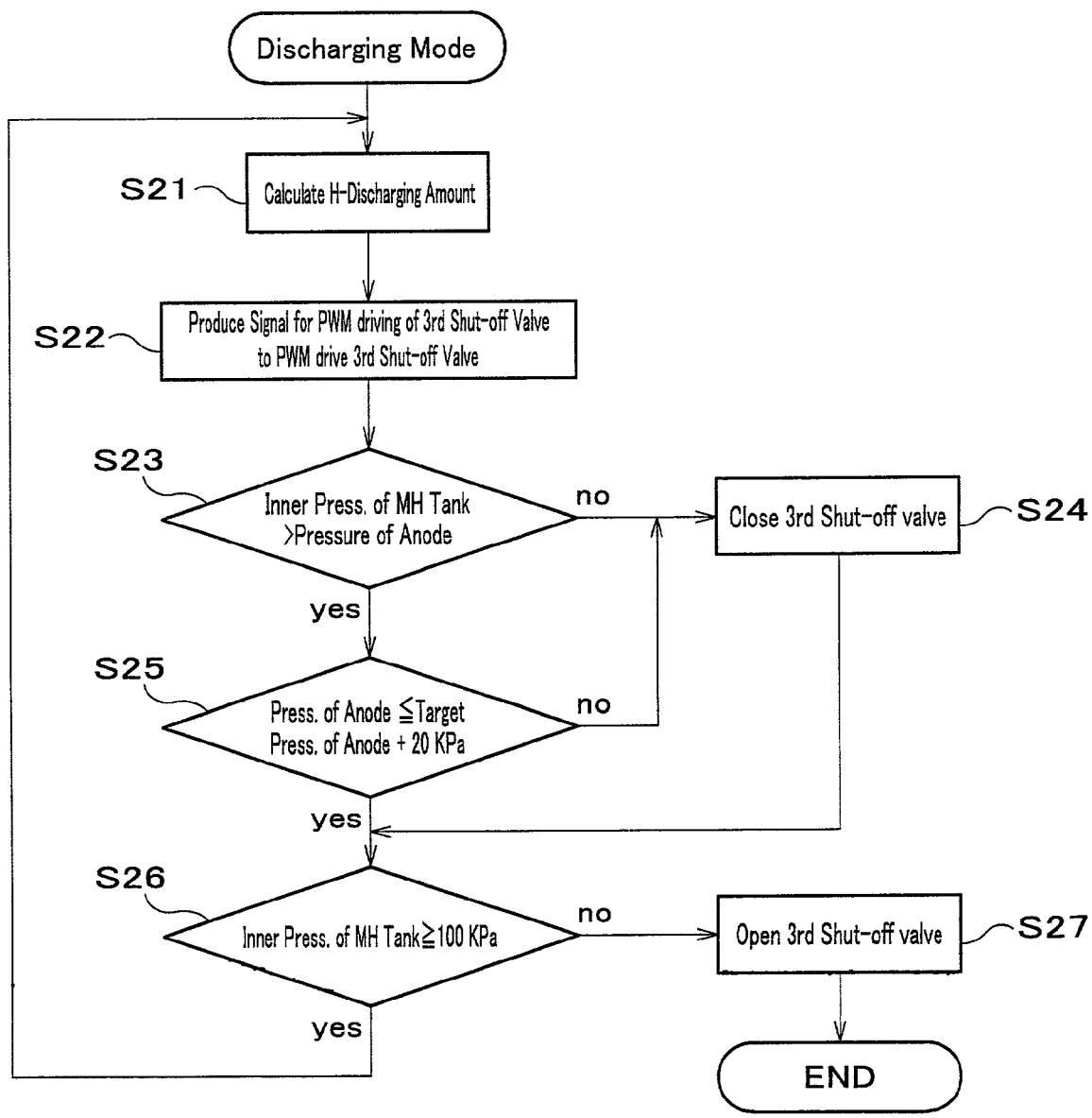
FIG. 8 is a flowchart which controls a discharge mode during which occluded hydrogen is discharged in the first embodiment.

FIG. 7 is a flowchart which illustrates the steps for controlling the warming-up in the first embodiment. FIG. 8 is a flowchart which illustrates the steps for controlling a discharge mode for discharging occluded hydrogen in the first embodiment.

The shift to the warming-up mode is controlled as follows (see FIG. 6).

In Step S1, when an ignition switch of the FCEV (see FIG. 4) is turned on (IG.ON), the control unit 60 performs system checking (S2). If the control unit 60 judges an abnormality (No) as a result of the system, the control unit 60 shifts the mode to an abnormal processing mode (S3). If the control unit 60 judges there to be no abnormality (Yes), it judges whether or not the temperature of the cooling water is 30° C. or less, which is the temperature required for starting the warming-up mode, i.e., the control system 60 judges whether or not the temperature of the cooling water ≦30° C. (S4). If the temperature is more than 30° C., i.e., if the cooling water has a temperature exceeding 30° C., the mode is shifted to a stationary power generation mode (S5). At the stationary mode, a power is generated in a usual manner without being shifted to the warming-up mode, because the FC 10 can be started with causing little or no trouble when the temperature exceeds 30° C. in the case of a PEM type FC. On the other hand, if the temperature of the cooling water is not more than 30° C., the FC 10 is shifted to the warming-up mode (S6).

The warming-up mode is controlled and executed as follows (see FIG. 5 and FIG. 7).

It is noted that in the fuel cell system F1 according to the first embodiment of the present invention, the supplying of hydrogen to the MH tank 31 and the supplying of hydrogen to the FC 10 can be carried out simultaneously. Consequently, at the warming-up in the first embodiment, while supplying hydrogen to the MH tank 31, hydrogen is also supplied to the FC 10 to generate power (power generation with warming-up).

At the warming-up mode in the first embodiment, the control unit 60 opens the primary and secondary shut-off valves 22 and 32 to be in their opened states, and closes the tertiary shut-off valve 33 to be in its closed state (S11). This supplies hydrogen (for warming-up the FC 10) from the high-pressure tank 21 to the MH tank 31 via the primary shut-off valve 22, the primary regulator 23, and the secondary shut-off valve 32. For a while, the inner pressure of the MH tank 31 is increased and the hydrogen-occlusion alloy occludes the hydrogen to generate heat. The heat is sharply generated and the inner temperature of the MH tank 31 increases, but the MH tank 31 is not overshot as described above (see FIG. 3). At this stage, since the air compressor 41 has not yet been started, the hydrogen is shut-off at the secondary regulator 24 and is not supplied to the FC 10.

Subsequently, the control unit 60 allows the circulating pump 35 making up the warming-up system 30, which also serves as a pump for circulating the cooling water of the primary cooling system C1 of the FC 10, for starting and, at the same time, allows the air compressor 41 for starting (S12), whereby the heat generated in the MH tank 31 is supplied to the FC 10 via the cooling water. At this time, the air is also supplied to the cathode of the FC 10. Upon supplying the air to the cathode, the pressure of the cathode is increased. At this time from the secondary regulator 24 utilizing the pressure of the cathode as the pilot pressure as described above, the hydrogen is supplied to the anode of the FC 10 (starting the power generation). The target power generation in the FC 10 at this time, for example, corresponds to the amount of electric power required for actuating the accessories such as the motor of the air compressor 41 and the circulating pump 35. Since no electric heater is used in this embodiment, it is not necessary to consider the addition of the consumption electric power for the electric heater to the target power generation. For this reason, the fuel ratio can be increased without wasting the valuable hydrogen for the additional device.

Subsequently, the control unit 60 judges whether or not the temperature of the cooling water is lower than the temperature after the completion of the MH-heating. The temperature after MH heating, which refers to the temperature for completing the supplying of the hydrogen for warming-up FC 10 to the MH tank, is 32° C., which is set 2° C. higher than the prescribed temperature for starting the warming-up. The reason why there is hysteresis between the prescribed temperature for supplying the hydrogen to the MH tank 31 to start the warming-up and the temperature after the MH heating which completes the supplying of the hydrogen to the MH tank 31 is for carrying out the control in a stable manner.

In Step 13, if the temperature of the cooling water is higher than the temperature after the MH heating (No), the secondary shut-off valve is closed to be in the closed state (S14), whereby the supplying of the hydrogen to the MH tank 31 from the high-pressure tank is stopped. This is due to the fact that the discharge mode will be smoothly performed. Since the FC 10 can be smoothly warmed-up through the combination of the residual heat of the heat generated in the MH tank with the heat accompanying with the power generation of the FC 10, no further heating is necessary.

Then, the control unit 60 judges whether or not the temperature of the cooling water is higher than the temperature after the completion of warming-up (S15), and if the temperature of the cooling water exceeds the temperature after the completion of warming-up (Yes), the mode is shifted to the discharge mode (S16). The temperature after the completion of the warming-up is here 70° C., which is the temperature capable of operating a PEM type FC 10 in a usual manner. If the temperature of the cooling water is lower than the temperature after the completion of warming-up (No), the judgment is continued until the temperature of the cooling water exceeds the temperature after the completion of warming-up, i.e., the warming-up mode is continued. The reason why the temperature after the MH heating and the temperature after the completion of warming-up are individually set is that there is a possibility to bring about the situation where the warming-up cannot be rapidly carried out due to the cooling of the FC 10 through the endothermic action of the hydrogen-occlusion alloy at the discharge mode. For this reason, in this embodiment, the temperature after the completion of the warming-up, which is the standard temperature for shifting the mode to the discharge mode, is set apart from the temperature after the completion of the MH heating.

Returning to the description of Step S13, if the temperature of the cooling water is lower than the temperature after the completion of the MH heating in Step S13 (Yes), the control unit 60 judges whether or not the inner pressure of the MH tank 31 is lower than the regulating pressure at the primary regulator 23 (S17). If the inner pressure of the MH tank 31 is equal to or higher than the regulating pressure at the primary regulator 23 (No), the secondary shut-off valve 32 is closed to be in the closed state (S18), because the occlusion of the hydrogen into the hydrogen-occlusion alloy may be judged to be saturated. In order to continue the warming-up even after the secondary shut-off valve 32 is in the closed state, the control unit 60 is shifted to Step 20.

In Step S17, if the inner pressure of the MH tank 31 is lower than the regulating pressure at the primary regulator 23 (Yes), in which case the MH tank can still occlude the hydrogen, the secondary shut-off valve 32 is opened (S19). After the secondary shut-off valve 32 is in the closed state in Step S18, the inner pressure of the MH tank 32 will be sometimes decreased due to the progress of the hydrogen-occlusion through the hydrogen-occlusion alloy. Even in such a case, i.e., even if the secondary shut-off valve 32 is in the closed state under the condition that the inner pressure of the MH tank 31 does, not satisfy the regulating pressure of the primary regulator 23, such a case is compensated in Step 19 and, thus, the warming-up mode is appropriately executed.

In Step S20, the situation is left standing for a prescribed period of time (for example, several seconds). In this course, the cooling water is circulated to warm-up the FC 10. The reason why the situation is left standing for a prescribed period of time is that the control is stabilized. After the situation is left standing for a prescribed period of time in Step S20, the control unit 60 is returned to Step S13, and judges whether or not the supplying of hydrogen to the MH tank 31 is completed based on the temperature of the cooling water, followed by continuing the subsequent treatments.

The discharge mode is controlled and executed as follows (see FIG. 5 and FIG. 8).

In the discharge mode, the control unit 60 calculates the amount of the hydrogen to be consumed based on the target power generation of the FC, and calculates the amount of the hydrogen supplied from the MH tank to the FC, i.e., the hydrogen-discharging amount based on the calculated amount of the hydrogen to be consumed (S21). For example, the hydrogen-discharging amount is calculated so as to be 20% of the amount of the hydrogen to be consumed. Alternatively, the hydrogen-discharging amount is calculated so as to offset the pressure variance of the anode. Based on the calculated hydrogen-discharging amount, the control unit 60 produces a signal for PWM-driving (pulse width modulation-driving) the tertiary shut-off valve 33 to PIM-drive (proportional-integral modulation drive) of the tertiary shut-off valve 33 (S22). This supplies the hydrogen from the MH tank 31 to the anode of the FC 10 via the tertiary shut-off valve 33 and the aperture 34. A larger amount of the hydrogen consumed corresponds to a wider pulse width of the signal (a larger duty ratio), increasing the amount of the hydrogen supplied from the MH tank 31 (the hydrogen-discharging amount). In order to have a reduced influence upon the flow of the hydrogen circulating through the anode of the FC 10, the tertiary shut-off valve 33 is PWM-driven.

The aperture 34 is provided in the same viewpoint, and reduces influence upon the flow of the hydrogen circulating through the anode of the FC 10.

Next, the control unit 60 judges whether or not the inner pressure of the MH tank 31 is larger than the pressure of the anode (S23). If the MH tank 31 is not larger than the pressure of the anode (No), the control unit 60 closes the tertiary shut-off valve 33 to be in the closed state, and is shifted to Step S26. This prevents the hydrogen from flowing backward. On the other hand, if the inner pressure of the MH tank 31 is larger than the pressure of the anode (Yes), the control unit 60 then judges whether or not the pressure of the anode is equal to or less than the target pressure of the anode plus 20 Kpa (S25).

If the pressure of the anode exceeds the target pressure of the anode plus 20 Kpa (Yes) in Step 25, the control unit 60 closes the tertiary shut-off valve 33 to be in the closed state, and then is shifted to Step 26. This is because a pressure of the anode appropriate for the power generation cannot be maintained if the pressure of the anode becomes too high. On the other hand, if the pressure of the anode is less than the target pressure of the anode plus 20 Kpa, which causes no problem, the control unit 60 is shifted to Step S26 without closing the tertiary shut-off valve 33.

Next, the control unit 60 judges whether or not the inner pressure of the MH tank 31 is equal to or more than 100 kPa (gauge pressure) (S26). If the inner pressure of the MH tank 31 is less than 100 kPa (No), the control unit 60 closes the tertiary shut-off valve 33 to be in the closed state (S27), and completes the control of the discharge mode (END). This is because the discharging of the hydrogen occluded in the hydrogen-occlusion alloy can be judged to be substantially completed if the inner pressure of the MH tank 31 is less than the gauge pressure of 100 kPa, and an amount of the calorie can be secured for executing the subsequent warming-up mode.

If the inner pressure of the MH tank 31 exceeds 100 kPa (Yes) in Step 26, the control unit 60 is returned to Step 21 to continue the discharge mode, because the hydrogen to be discharged has still been occluded in the MH tank 31, and the discharging of the hydrogen is preferred for carrying out the next warming-up with a larger amount of calories in a better manner.

Since the reaction of discharging the hydrogen having been occluded in the hydrogen-occlusion alloy is an endothermic reaction, the temperature of the hydrogen-occlusion alloy (the inner pressure of the MH tank 31) is decreased. For a while, the hydrogen cannot be discharged from the hydrogen-occlusion alloy any more as a rule. However, as in the case of this embodiment, by allowing the cooling water of the FC 10 for flowing into the MH tank 31 (jacket portion thereof), the heater generated accompanying with the power generation of the FC 10 is supplied to the hydrogen-occlusion alloy. Consequently, the hydrogen can be stably and surely taken from the MH tank 31. By discharging the whole of hydrogen from the MH tank 31, the amount of calories for the next warming-up can be secured.

Next, referring to the time chart shown in FIG. 9, the actuation of the fuel cell system F1 of the first embodiment of the present invention will now be described (also see sometimes FIG. 5).

Figure 9:
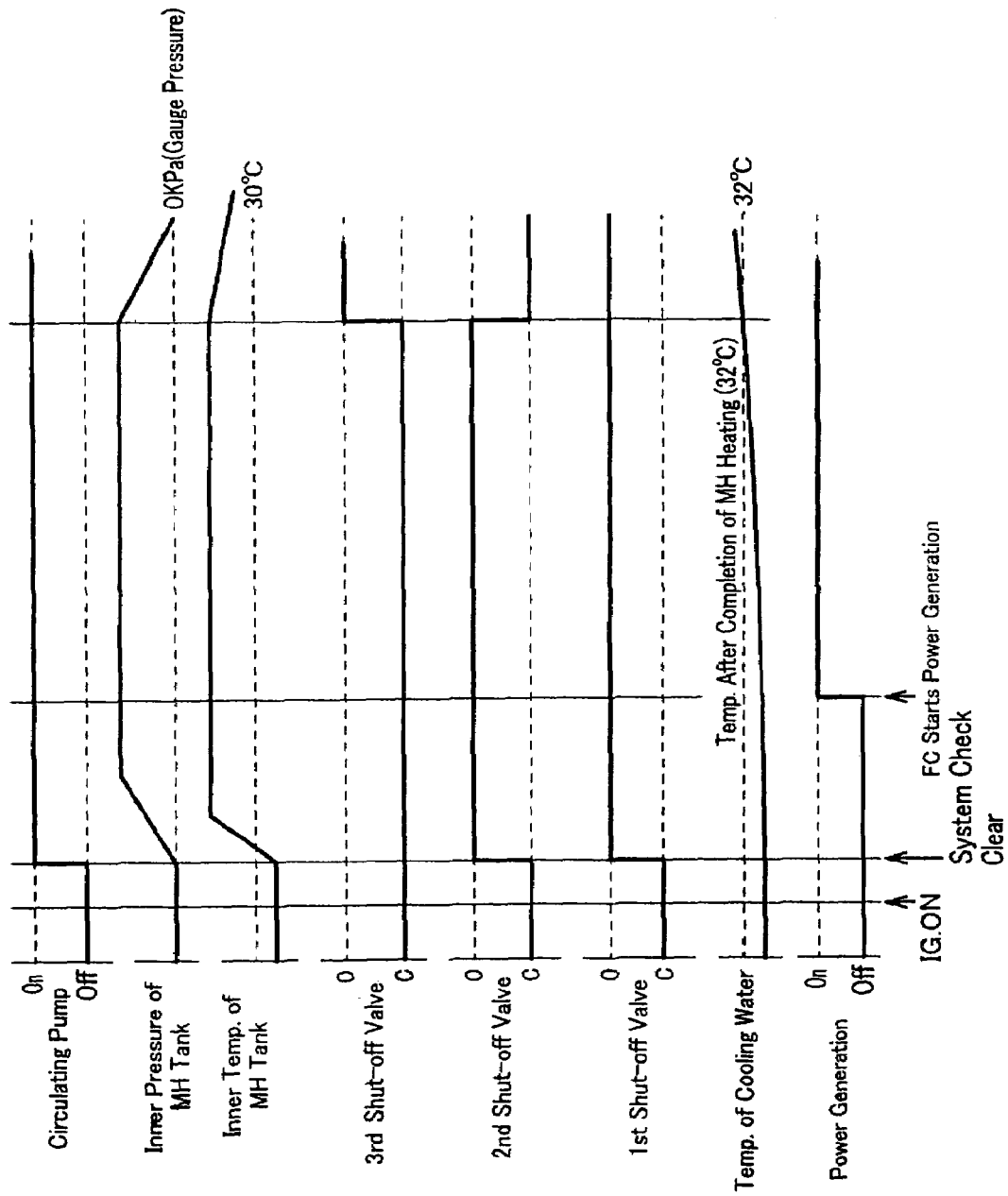
FIG. 9 shows a control time chart at the starting of a FC system in the first embodiment.

FIG. 9 shows a control time chart at the starting of a FC system in the first embodiment.

First, the first shut-off valve 22, the second shut-off valve 32 and the third shut-off valve 33 are closed in their closed states. The circulating pump 35 is stopped (Off). The temperature of the cooling water of the FC 10 is less than 30° C., which is the prescribed temperature for starting the warming-up mode. The inner pressure of the MH tank 31 is about 0 kPa (gauge, pressure). Of course, the FC 10 has not generated power (Off). In the discharging of the hydrogen from the MH tank 31 at the discharge mode, the amount of the hydrogen to be discharged is restricted so as to not have any influence upon the warming-up of the FC 10.

Under theses conditions, an ignition switch of the FCEV (see FIG. 4) is turned on (IG.ON). This executes the control as shown in FIG. 6, and, if no abnormality is found in the system and if the temperature of the cooling water is not higher than 30° C., the mode is shifted to the warming-up mode (System Check Clear).

For the while, the control of the warming-up mode shown in FIG. 7 is executed, whereupon the primary shut-off valve 22 and the secondary shut-off valve 32 are opened in their opened state. At the same time, the circulating pump 35 is started (On). This supplies the hydrogen to the MH tank 3, increasing the inner pressure of the MH tank 31. Also, the temperature of the cooling water is increased and the cooling water having an increased temperature is circulated within the warming-up system 30 (primary cooling system C1), whereby the heat generated in the MH tank 31 warms up the FC 10. In the time chart shown in FIG. 9, no power generation is carried out at this time (System Check Clear). Specifically, the air compressor 41 has not yet been started.

Upon supplying the hydrogen to the MH tank 31, the temperature of the MH tank 31 immediately reaches the maximum temperature and, thereafter, is maintained at a constant temperature. As for the inner pressure of the MH tank 31, it becomes constant at a high level after a period of time. During this course, the warming-up is continued.

In the time chart shown in FIG. 9, before the completion of heating the MH tank 31, the power generation by the FC 10 is started (Stack power generation is started). For this reason, the battery or such is utilized to start the air compressor 41 and any other necessary accessories. This supplies the hydrogen and oxygen to the FC 10. Then, when the voltage of the FC increases (releasing voltage), the load current is taken to the air compressor and the like via the VCU 51.

Then, when the temperature of the cooling water reaches 32° C., which is the temperature of the completion of the MH-heating, in order to complete the supplying of the hydrogen to the MH tank 31, the secondary shut-off valve 32 is closed to be the closed state. In this time chart, as soon as the completion of the warming-up, the hydrogen having been occluded in the MH tank 31 is discharged until the inner pressure becomes 0 kPa (at the fullest extent) (discharge mode). In order to do so, the tertiary shut-off valve 33 is opened to be the opened state. As described previously, if the discharge mode is executed before the temperature of the FC 10 reaches the stationary mode temperature (e.g., 70–80° C.), there is a possibility that the situation would occur where the warming-up of the FC cannot be carried out smoothly. However, as described above, in the time chart shown in FIG. 9, the amount of the hydrogen to be discharged is restricted so as to not have any influence upon the warming-up. Consequently, at the time when the temperature of the cooling water reaches the temperature of the completion of the MH-heating, i.e., before the FC 10 is sufficiently warmed up, the discharge mode is executed. Also, in the case where the endothermic heat in the discharge mode is not supplied (transmitted) to the FC 10, the discharge mode can be executed when the temperature of the cooling water reaches the temperature at the completion of the MK-heating.

As described above, according to the first embodiment of the present invention, the FC 10 can be surely warmed-up by utilizing the heat generated during the course of occluding the hydrogen in the hydrogen-occlusion alloy. Also, it is possible to discharge the hydrogen having been occluded, which can be used in the power generation as the fuel gas. By discharging the hydrogen, the warming-up can be repeatedly carried out. Since the power generation is carried out while warming up the FC 10 in this embodiment, the warming-up can be carried out in a rapid manner together with the self-heating of the FC 10. Also, since the hydrogen is supplied from the high-pressure tank 21 to the MH tank 31, the hydrogen for use in the warming-up can be incorporated if the high-pressure tank 21 is filled with hydrogen. In this context, differing from the specially providing a hydrogen tank only for the warming-up, the complication of the hydrogen filling can be reduced.

The temperature of the MH tank 31 is accorded with the temperature-pressure characters of the hydrogen-occlusion alloy (drawings showing the characteristics between the inner temperature of the MH tank 31 and the pressure thereof; see FIG. 2). If the type of the hydrogen-occlusion alloy and the hydrogen pressure applied are the same, the amount of the heat generated is in proportional to the amount of the hydrogen-occlusion alloy. Consequently, taking the type of the hydrogen-occlusion alloy, the hydrogen pressure to be applied to the MH tank 31, and the amount of the hydrogen-occlusion alloy as parameters, the characteristics of the MH tank 1 (what is called hydrogen-occlusion type heater or MH heater) can be freely designed. On the other hand, at the time of discharging the hydrogen having been occluded, the discharging amount thereof and the endothermic amount can be freely controlled taking the type of the hydrogen-occlusion alloy, the pressure, and the temperature as parameters.

Even if the inner pressure of the MH tank 31 is increased excessively, the amount of the hydrogen to be occluded (stored) is not so increased. On the other hand, from the viewpoint of the pressure resistance, the thickness of the MH tank 31 should be increased, in which case, the heat generated in the interior of the MH tank 31 can be taken only with difficulty. In addition, the weight of the MH tank is increased accordingly. Furthermore, with regard to the discharging of the hydrogen having been occluded, the heat is supplied to the interior of the MH tank 31 having an increased thickness in a difficult manner. From these points, the inner pressure of from 1 to 5 Mpa (more preferably from 1 to 3 MPa), is preferable in terms of the facts that hydrogen can be effectively occluded, that the thickness of the MH tank 31 may not be excessively thick, as well as in terms of the heat transmission and weight.

Second Embodiment

Next, the second embodiment will be described.

The second embodiment of the present invention is an embodiment where a FC is warmed up, and then the FC generates power. The second embodiment is an embodiment that under the condition that the cooling water has the lowest temperature, e.g., not more than −20° C., FC is warmed-up. Symbols for the portions which are common to those of the first embodiment are referred to the same symbols as those of the first embodiment, and the description of such portions will be omitted.

Figure 10:
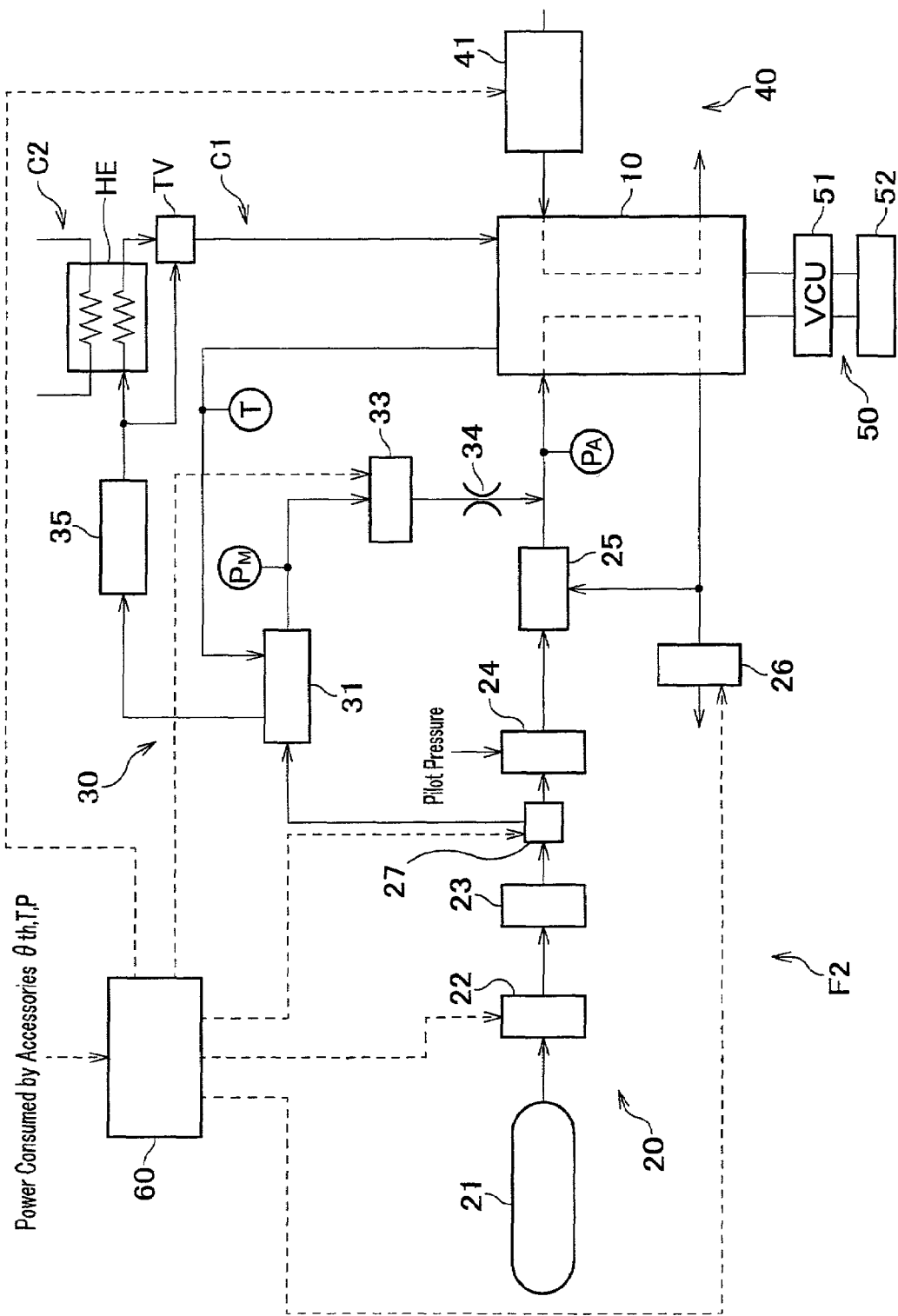
FIG. 10 is a block diagram of a FC system according to the second embodiment of the present invention.

FIG. 10 is a block diagram of a FC system according to the second embodiment of the present invention.

As shown in FIG. 10, the fuel cell system F2 according to the second embodiment has no shut-off valve corresponding to the secondary shut-off valve 32 shown in FIG. 5. In stead, the fuel cell system F2 according to the second embodiment has a three-way valve 27. The three-way valve 27 is a dielectrically actuated valve for switching the passages, and is switched to a stationary position or a warming-up position based on a signal from the control unit 60. When the three-way valve 27 is in the stationary position, the hydrogen form the high-pressure tank 21 is directed towards the secondary regulator 24. On the other hand, when the three-way valve 27 is in the warming-up position, the hydrogen from the high-pressure tank 21 is directed towards the MH tank 31. For this reason, when the hydrogen is being supplied to the MH tank 31, i.e., when the FC 10 is under the warming-up, the hydrogen is never supplied to the FC 10 via the secondary regulator 24. On the other hand, when the hydrogen is supplied to the FC 10 via the secondary regulator 24, the hydrogen is never supplied to the MH tank 31.

The control unit 60 serves to judge whether or not the FC 10 should be warmed-up at the time of the starting (control of being shifted to the warming-up mode), controlling the warming-up (control of the warming-up mode), controlling the discharge of the hydrogen having been occluded (control of the discharge mode), and the like. In this respect, the roles of the control unit 60 are the same as those of the first embodiment.

The control of the warming-up mode will be described together with the operation of the fuel cell system F2. However, since the control of being shifted to the warming-up mode and the control of the discharge mode in this embodiment are the same as those of the first embodiment, these descriptions will be omitted.

Figure 11:
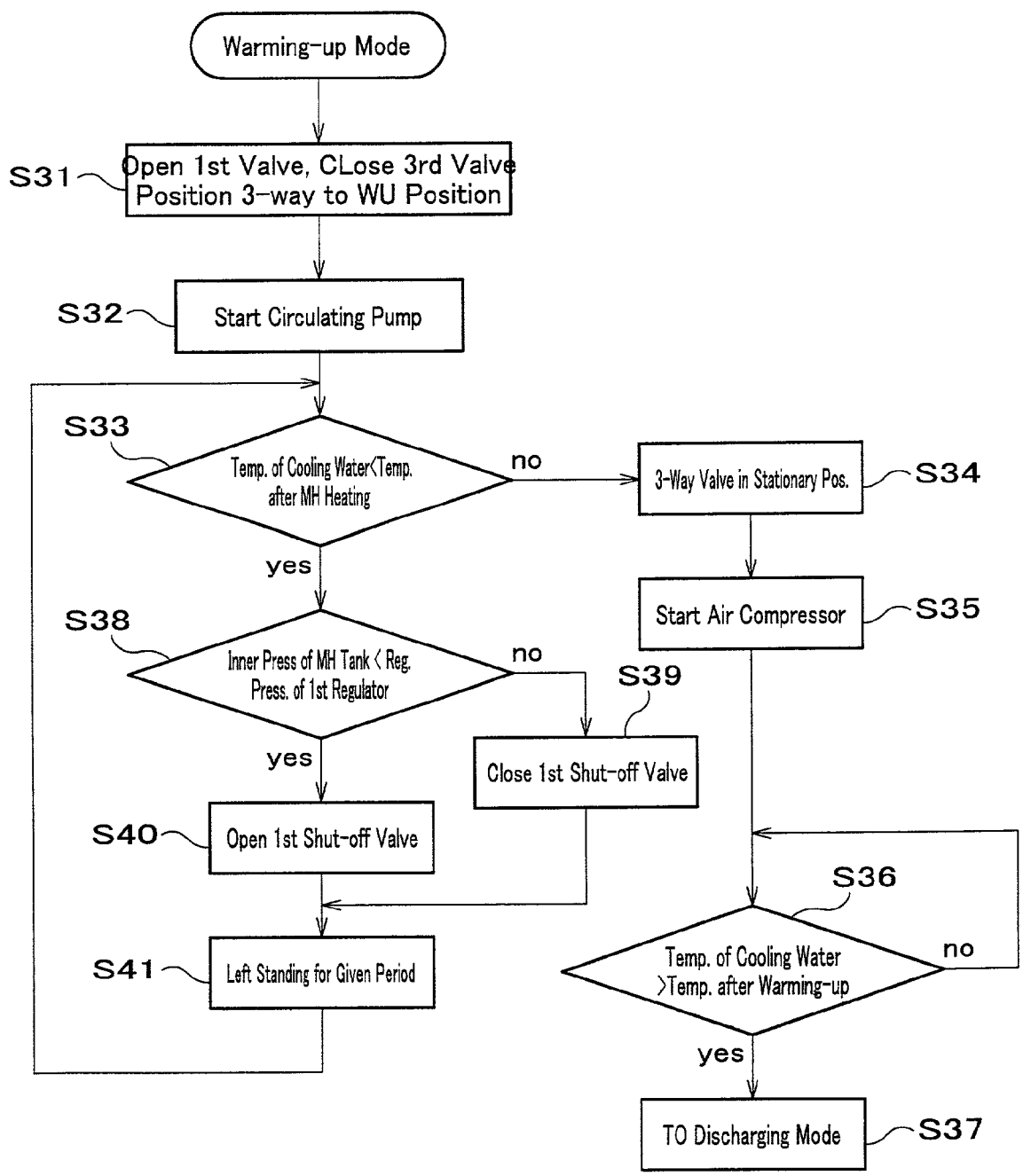
FIG. 11 is a flowchart which controls the warming-up in the second embodiment.

FIG. 11 is a flowchart which illustrating the steps for controlling the warming-up mode.

In the second embodiment, the warming-up mode is controlled and executed as follows (see FIG. 10 and FIG. 11).

Since the three-way valve 27 is used in the second embodiment to switch the passage of the hydrogen, the supplying of the hydrogen to the MH tank 31 and the supplying of the hydrogen to the FC 10 cannot be carried out at the same time. Consequently, in the warming-up mode in the second embodiment, after the hydrogen is supplied to the MH tank (after the temperature becomes not lower than the temperature after the completion of the MH-heating), the position of the three-way valve 27 is switched to generate power.

In the warming-up mode in the second embodiment, the control unit 60 opens the primary shut-off valve 23 to be in the opened state, and closes the tertiary shut-off valve 33 to be in the closed state. Furthermore, the control unit 60 positions the three-way valve 27 into the warming-up position (S31). This supplies the hydrogen from the high-pressure tank 21 to the MH tank 31 via the primary shut-off valve 22, the primary regulator 23, and the three-way valve 27, whereupon the inner pressure of the MH tank is increased and the hydrogen-occlusion alloy occludes the hydrogen, generating heat. The heating will rapidly occur and the inner temperature of the MH tank 31 is immediately increased, but the temperature is never overshot as described previously (see FIG. 3).

The control unit 60 starts a circulating pump 35 for the warming-up system 30, which also serves as the circulating pump for the primary cooking system C1 of the FC 10 (S32). This supplies the heat generated in the MH tank 31 to the FC 10 via the cooling water.

Subsequently, the control unit 60 judges whether or not the temperature of the cooling water is lower than the temperature after the completion of the MH-heating (S33). The temperature after the completion of MH heating is 32° C., which is set 2° C. higher than the prescribed temperature for starting the warming-up for the purpose of the stabilization of the control as in the first embodiment.

If the temperature of the cooling water is not lower than the temperature after the completion of the MH-heating in Step 33 (No), the three-way valve 27 is positioned to the stationary position (S34). This switches the passage, stopping the supplying of the hydrogen from the high-pressure tank 21 to the MH tank 31, while making it possible to supply the hydrogen to the FC 10. The supplying of the hydrogen to the MH tank 31 is stopped for the purpose of smoothly executing the discharge mode. Since the FC 10 can be smoothly warmed-up through the combination of the residual heat of the heat generated in the MH tank with the heat accompanying with the power generation of the FC 10, no further heating is necessary. In relation to Step S39, which will be described fully later on, since the primary shut-off valve 22 is sometimes in the closed state, the operation of opening the primary shut-off valve 22 in included in Step S34.

In Step S35, the control unit 60 starts the air compressor 41. This supplies the air to the cathode of the FC 10, while supplying the hydrogen to the anode of the FC 10 (starting power generation). The target power generation at this time is the same as that of the first embodiment. This makes it possible to smoothly warm-up the FC 10 by the residual heat of the heat generated in the MH tank together with the heat accompanying the power generation of the FC 10.

In Step S36, the control unit 60 judges whether or not the temperature of the cooling water is higher than the temperature after the completion of the warming-up. If the temperature of the cooling water exceeds the temperature after the completion of the warming-up (Yes), the control unit 60 is shifted to the discharge mode (S37). The temperature after the completion of the warming-up is set at 70° C., which is the same temperature as that of the first embodiment. If the temperature of the cooling water does not exceed the temperature after the completion of the warming-up (No), the judgment is continued until the temperature of the cooling water exceeds the temperature after the completion of the warming-up. Specifically, the warming-up is continued. The description of these points, which are the same as those of the first embodiment, will be omitted.

Returning to the description of Step S33, if the temperature of the cooling water is lower than the temperature after the completion of the MH heating in Step S33 (Yes), the control unit 60 judges whether or not the inner pressure of the MH tank 31 is lower than the regulating pressure at the primary regulator 23 (S38). If the inner pressure of the MH tank 31 is equal to or higher than the regulating pressure at the primary regulator 23 (No), the primary shut-off valve 22 is closed to be in the closed state (S39), because the occlusion of the hydrogen into the hydrogen-occlusion alloy may be judged to be saturated. In order to continue the warming-up even after the primary shut-off valve 22 is in the closed state, the control unit 60 is shifted to Step 41. It is also possible to have a configuration that in Step S39, the primary shut-off valve 39 is kept opening and the three-way valve 27 is switched to the stationary state.

In Step S38, if the inner pressure of the MH tank 31 is lower than the regulating pressure at the primary regulator 23 (Yes), in which case the MH tank can still occlude the hydrogen, the primary shut-off valve 22 is opened (S40).

After the primary shut-off valve 22 is in the closed state in Step S39, the inner pressure of the MH tank 32 will be sometimes decreased due to the progress of the hydrogen-occlusion through the hydrogen-occlusion alloy. Even in such a case, i.e., even if the primary shut-off valve 22 is in the closed state under the condition that the inner pressure of the MH tank 31 does riot satisfy the regulating pressure of the primary regulator 23, such a case is compensated in Step 40 and, thus, the warming-up mode is appropriately executed.

In Step S41, the situation is left standing for a prescribed period of time (for example, several seconds). In this course, the cooling water is circulated to warm-up the FC 10. The reason why the situation is left standing for a prescribed period of time is that the control is stabilized. After the situation is left standing for a prescribed period of time in Step S41, the control unit 60 is returned to Step S33, and judges whether or not the supplying of hydrogen to the MH tank 31 is completed based on the temperature of the cooling water.

In the fuel cell system F1 according to the first embodiment described previously, while supplying the hydrogen to the MH tank 31 (heating the MH tank 31), the hydrogen is also supplied to the FC 10 to generate power. However, in the fuel cell system F2 according to this embodiment, the FC 10 never generates power during the course of supplying the hydrogen to the MH tank 31, because the hydrogen flow is switched by means of the three-way valve 27.

Next, the operation of the fuel cell system of the second embodiment will be described by reference to the time chart of FIG. 12 (also see FIG. 10).

Figure 12:
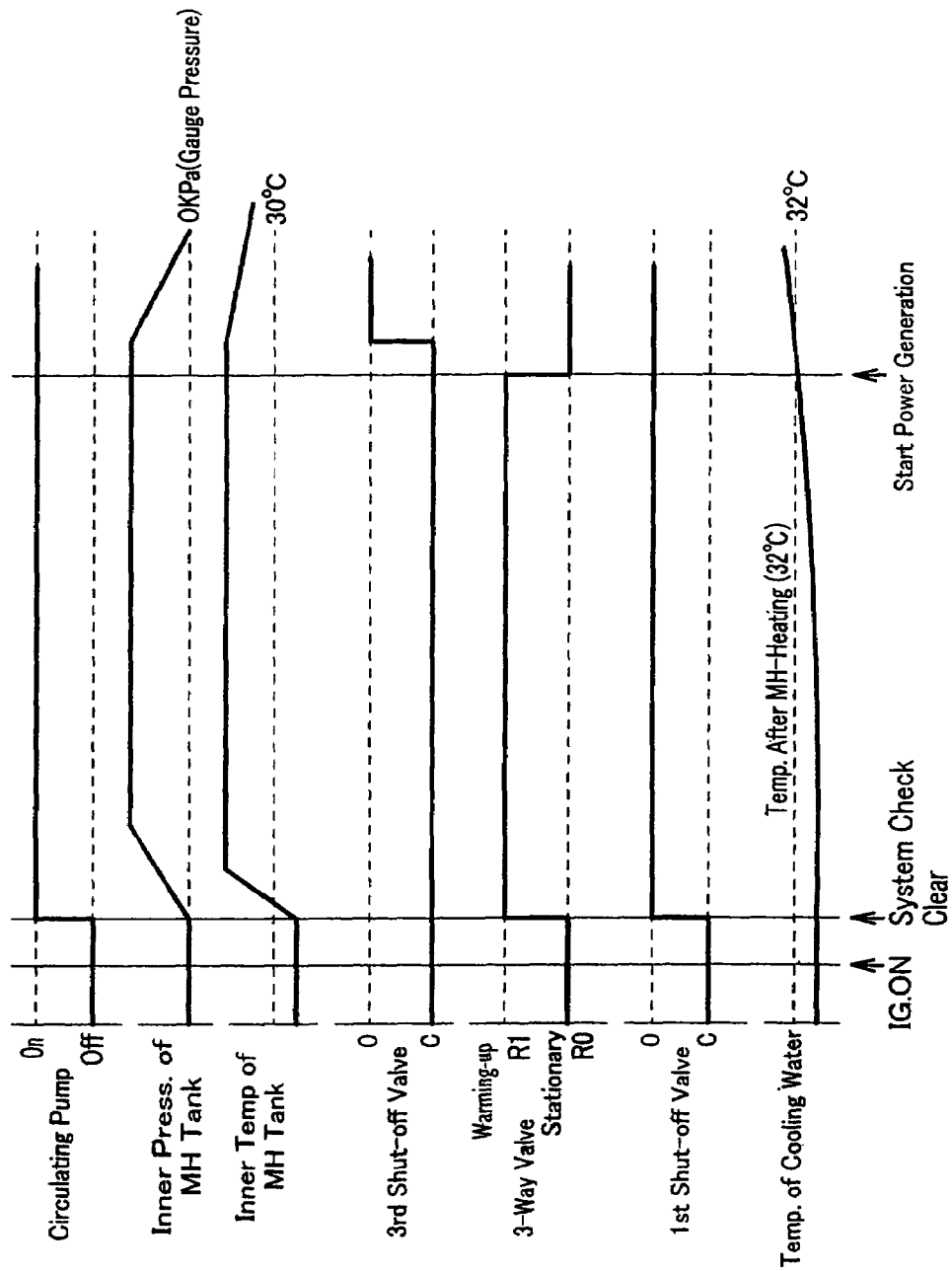
FIG. 12 shows a control time chart at the starting of a FC system in the second embodiment.

FIG. 12 shows a control time chart at the starting of a FC system in the second embodiment.

First, the first shut-off valve 22, and the three-way valve 27 are in the stationary position. The circulating pump 35 is stopped (Off). The temperature of the cooling water of the FC 10 is less than 30° C., which is the prescribed temperature for starting the warming-up mode. The inner pressure of the MH tank 31 is about 0 kPa (gauge pressure). Of course, FC 10 has not generated power (Off).

Under theses conditions, an ignition switch of the FCEV (see FIG. 4) is turned on (IG.ON). This executes the control as shown in FIG. 6, and, if no abnormality is found in the system and if the temperature of the cooling water is not higher than 30° C., the mode is shifted to the warming-up mode (System Check Clear).

For the while, the control of the warming-up mode shown in FIG. 11 is executed, whereupon the primary shut-off valve 22 is opened in the opened state. At the same time, the circulating pump 35 is started (On). This supplies the hydrogen to the MH tank 3, increasing the inner pressure of the MH tank 31. Also, the temperature of the cooling water is increased and the cooling water having an increased temperature is circulated within the warming-up system 30 (primary cooling system C1), whereby the heat generated in the MH tank 31 warms up the FC 10.

Upon supplying the hydrogen to the MH tank 31, the temperature of the MH tank 31 immediately reaches the maximum temperature and, thereafter, is maintained at a constant temperature. As for the inner pressure of the MH tank 31, it becomes constant at a high level after a period of time. During this course, the warming-up is continued.

Then, when the temperature of the cooling water reaches 32° C., which is the temperature at the completion of the MH-heating, in order to complete the supplying of the hydrogen to the MH tank 31, the three-way valve 27 is switched to the stationary position. In the second embodiment, when the three-way valve 27 is switched to the stationary position, the air compressor 41 is started to supply the air to the FC 10. The pressure of the cathode is increased when the air compressor 41 is started, and the hydrogen is supplied to the anode as in the first embodiment whereby the FC 10 starts the power generation.

In the time chart shown in FIG. 12, after the completion of the warming-up, the hydrogen having been occluded in the MH tank 31 is discharged (discharge mode). In order to do so, the tertiary shut-off valve 33 is opened to be the opened state. At the discharge mode, the control similar to the control in the flowchart of FIG. 8 is executed. In the discharge mode as in this embodiment that the primary cooling system C1 for the FC 10 also serves as the warming-up system 30, preference is given to restrict the discharge amount of hydrogen in the discharge mode or to carry out the discharge mode after the warming-up of the FC 10 has been perfectly completed to be shifted to the stationary power generation mode, as described above.

As described above, according to the second embodiment of the present invention, the FC 10 can be surely warmed-up by utilizing the heat generated during the course of occluding the hydrogen in the hydrogen-occlusion alloy. Also, it is possible to discharge the hydrogen having been occluded, which can be used in the power generation as the fuel gas. By discharging the hydrogen, the warming-up can be repeatedly carried out. Since the power generation is carried out while warming up the FC 10 in this embodiment, the warming-up can be carried out in a rapid manner together with the self-heating of the FC 10. According to this embodiment, even from the lowest temperature at which the FC 10 cannot generate power, the FC 10 can be securely warmed-up. The consumption power required in this case is for the control unit 60, valves (22, 27, and 33), and the circulating pump 35. Consequently, differing from the conventional warming-up utilizing a heater, the FC 10 can be warmed-up without excess loading of the battery. In this context, this embodiment is suitable for warming-up the FC 10 at the coldest place, where the electromotive force is lowered.

Third Embodiment

Next, the third embodiment will be described (see FIG. 5 and the like).

The third embodiment of the present invention is an embodiment where the FC 10 generates power while warming-up the FC 10 (power generation with warming-up), and in the case of the lowest temperature (lower than the lower limit of a prescribed temperature), the FC does not generate power, only the warming-up of the FC 10 is carried out. For this reason, the control unit 60 of the fuel cell system F3 (see FIG. 5) according to the third embodiment supply the hydrogen both to the MH tank 31 and the FC 10 to generate power with warming-up if the temperature of the cooling water is with the prescribed range of from −20° C. to 30° C. On the other hand, if the temperature of the cooling water is less than −20° C. (the lowest temperature), the control unit 60 supplies the hydrogen only to the MH tank to warm-up the FC.

The configuration of the devices making up the system (warming-up apparatus) according to the third embodiment is the same as that in the first embodiment and, thus, the description thereof will be omitted.

Figure 13:
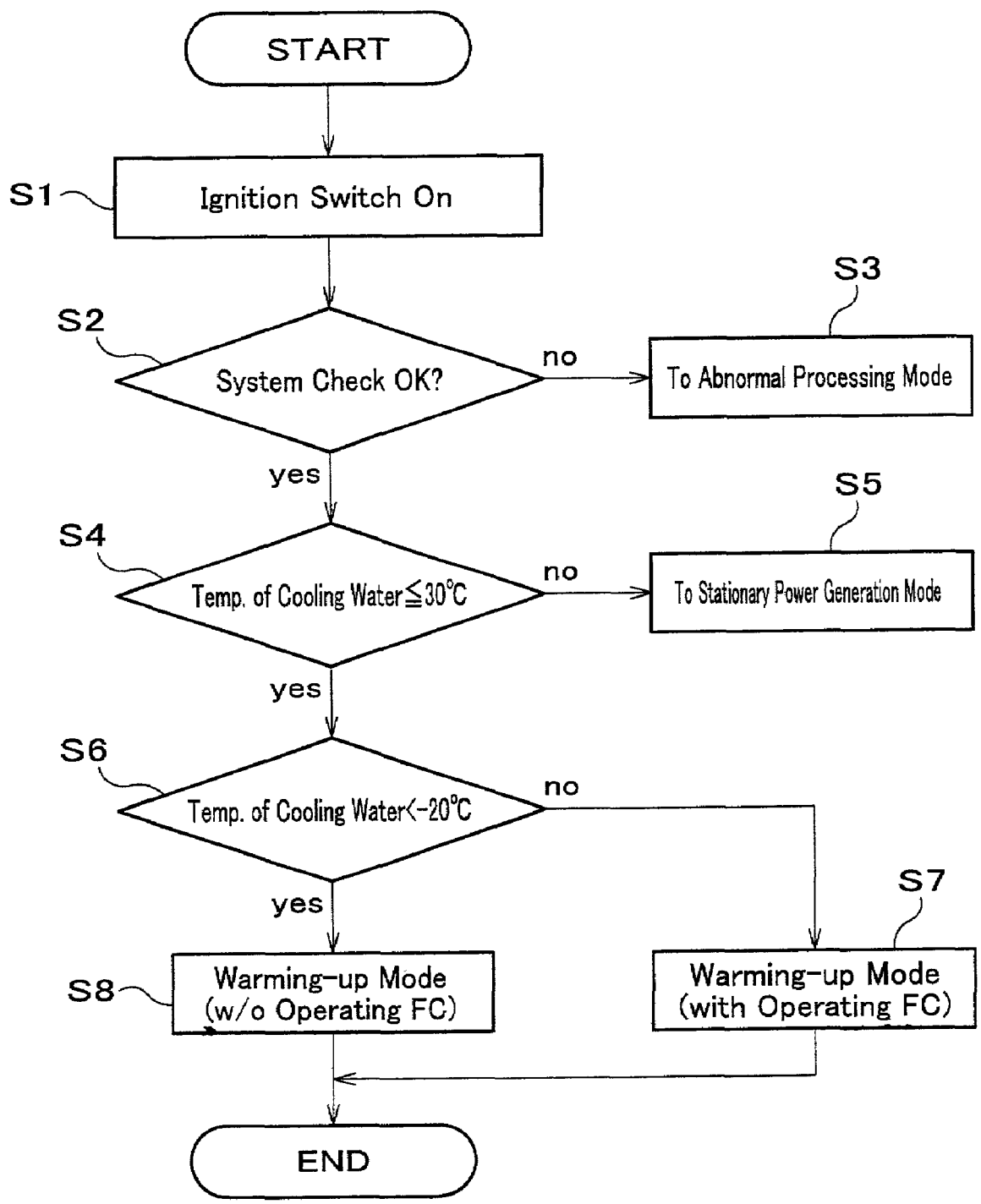
FIG. 13 is a flowchart which controls the shifting to a warming-up mode, which executes the warming-up of a FC according to the third embodiment.

Referring to FIG. 13, the actuation of the fuel cell system F3 according to the third embodiment will be described.

FIG. 13 is a flowchart which controls the shifting to a warming-up mode, which executes the warming-up of the FC according to the third embodiment.

The description of Steps S1 to S5 in FIG. 13, which are the same as those in the flowchart for controlling the mode being shifted to the warming-up mode for warming-up the FC 10 in the first embodiment, are omitted.

In Step S4, if the temperature of the cooling water is less than 30° C., the control unit 60 judges whether or not the temperature of the cooling water is less than −20° C. in Step S7. If the temperature of the cooling water is not less than −20° C. (No), the warming-up mode while warming-up the FC 10 (with warming-up) is executed (S8). Conversely, if the temperature of the cooling water is less than −20° C. (Yes), which is the lowest temperature, the warming-up mode without warming-up the FC 10 (without warming-up) is executed (S9). In the warming-up mode in Step S9, at the time of the temperature of the cooling water for the FC 10 being not less than −20° C., the air compressor 41 is started. With starting the air compressor 41, the air and hydrogen are supplied to the FC to start the FC 10 for generating power.

According to the third embodiment just mentioned, even at the lowest temperature, which can never make a power generation, the FC 10 can be surely warmed-up.

While the embodiments of the present invention have been described, it should be noted that the present invention is not restricted thereto, and various modification can be made without departing from the scope and the sprits of the present invention.

For example, whereas the FC 10 is warmed-up by the cooling water, the heat generated during the course of the occlusion of the hydrogen in the hydrogen-occlusion alloy is directed to the FC box (see FIG. 4), and by the heating the FC box, the FC 10 may be warmed-up. Also, whereas the MH tank 31 is configured to be disposed at the rear portion of the FCEV, it may be configured to be accommodated within the FC box. Also, the fuel gas and/or air may be humidified for use as the heating medium. Also, in the first and second embodiment, the tertiary shut-off valve 33 is PWM driven and the aperture 34 is provided, but the aperture may be omitted. Alternatively, if the aperture is provided, the positions of the tertiary shut-off valve 33 and that of the aperture 34 may be replaced, and the tertiary valve 34 is made up by a usual ON-OFF valve. Also, the positions of the tertiary shut-off valve 33 and that of the aperture 34 may be replaced to dispose the aperture on the upstream side. Also, while the prescribed temperature range for the power generation with warming-up is within the temperature from −20° C. to 30° C., the prescribed temperature may be freely set. For example, the lower limit may be set at −35° C., while the upper limit may be set at 20° C.

While the hydrogen discharged from the MH tank 31 is supplied to the downstream side of the ejector 25, it may be supplied to the upstream side thereof. Also, the discharge of the hydrogen having been occluded may not be carried out at the same time of the completion of the warming-up mode, and may be carried out until the FCEV is stopped. Also, in the second embodiment, the three-way valve 27 has been utilized for the description, but the passage switching means is not restricted to the three-way valve. For example, the passage switching means may be composed of a combination of (1) a shut-off valve which shuts off the hydrogen flow from the primary regulator 23 towards the secondary regulator 24, and a shut-off valve which shuts off the hydrogen flow from the primary regulator 23 to the MH tank (corresponding to the secondary shut-off valve in the first embodiment). While the power generation is started at the temperature exceeding 32° C. in the second embodiment, it may be started at the time of exceeding −20° C. In this case, the passage switching valve described above is disposed in place of the three-way valve 27. Also, in the third embodiment, the power generation may be started at the time which the temperature of the cooling water reaches the temperature after the completion of the MH heating 32° C.). Also, while these embodiments exemplify a PEM type FC 10, the present invention is not restricted to a PEM type FC 10. Also, the fuel cell carried electric vehicle (FCEV) has been described, a hydrogen vehicle which carries a hydrogen engine (hydrogen-consumption apparatus) utilizing hydrogen as fuel is applicable to the present invention.

What is claimed is:

1. A warming-up apparatus for a fuel cell, which generates power due to an electrochemical reaction between hydrogen gas, which is fuel, and oxygen gas, which is an oxidant, which comprises:
    (a) a high-pressure tank for storing hydrogen gas;
    (b) a hydrogen-occlusion alloy tank having a hydrogen-occlusion alloy accommodated therein;
    (c) a branched pipe connecting the high-pressure tank to the hydrogen-occlusion alloy tank and the fuel cell, the branched pipe including a first branch for transferring hydrogen discharged from said high-pressure tank to the hydrogen-occlusion alloy in said hydrogen-occlusion alloy tank and a second branch for transferring hydrogen discharged from said high-pressure tank to the fuel cell; and
    (d) heat-transmitting means which transmits heat from the hydrogen-occlusion alloy tank to the fuel cell, wherein the heat is generated in the hydrogen-occlusion alloy during the course of storing the hydrogen gas transferred by said first branch of the branched pipe into said hydrogen-occlusion alloy tank.

2. A warming-up apparatus for a fuel cell, which generates power due to an electrochemical reaction between hydrogen gas, which is fuel, and oxygen gas, which is an oxidant, which comprises:
    (a) a high-pressure tank for storing hydrogen gas;
    (b) a hydrogen-occlusion alloy tank having a hydrogen-occlusion alloy accommodated therein;
    (c) a three-way valve for switching between a stationary position, in which hydrogen discharged from the high-pressure tank is directed towards the fuel cell, and a warming-up position, in which hydrogen discharged from the high-pressure tank is directed towards the hydrogen-occlusion alloy tank; and
    (d) heat-transmitting means which transmits heat from the hydrogen-occlusion alloy tank to the fuel cell, wherein the heat is generated in the hydrogen-occlusion alloy during the course of storing the hydrogen gas transferred by said three-way valve in said warming-up position into said hydrogen-occlusion alloy tank.

* * * * *